United States Patent
Ozawa et al.

(10) Patent No.: US 9,154,767 B2
(45) Date of Patent: Oct. 6, 2015

(54) DATA BROADCAST DISPLAY DEVICE, DATA BROADCAST DISPLAY METHOD, AND DATA BROADCAST DISPLAY PROGRAM

(75) Inventors: Yuka Ozawa, Osaka (JP); Toru Kawaguchi, Osaka (JP); Hiroshi Yahata, Osaka (JP); Yasushi Uesaka, Hyogo (JP); Tomoki Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 654 days.

(21) Appl. No.: 13/477,803

(22) Filed: May 22, 2012

(65) Prior Publication Data
US 2012/0299908 A1 Nov. 29, 2012

Related U.S. Application Data

(60) Provisional application No. 61/489,396, filed on May 24, 2011.

(51) Int. Cl.
G06T 15/00 (2011.01)
G06K 9/00 (2006.01)
(Continued)

(52) U.S. Cl.
CPC ......... *H04N 13/004* (2013.01); *H04N 13/0051* (2013.01); *H04N 13/007* (2013.01); *H04N 13/0059* (2013.01); *H04N 13/0438* (2013.01); *H04N 13/0497* (2013.01)

(58) Field of Classification Search
CPC .......... H04N 13/0497; H04N 13/0438; H04N 13/0048; H04N 13/0003; H04N 13/0007; H04N 13/0275; H04N 21/4347; H04N 21/4348; H04N 21/4622; H04N 13/004; H04N 13/0051
USPC ........................................................ 345/419
See application file for complete search history.

(56) References Cited

U.S. PATENT DOCUMENTS

2002/0118275 A1 8/2002 Harman
2008/0192112 A1 8/2008 Hiramatsu et al.
(Continued)

FOREIGN PATENT DOCUMENTS

CN 1462416 12/2003
CN 101180891 5/2008
(Continued)

OTHER PUBLICATIONS

International Search Report issued Jun. 19, 2012 in International (PCT) Application No. PCT/JP2012/003333.
(Continued)

*Primary Examiner* — Devona Faulk
*Assistant Examiner* — Nicole Gillespie
(74) *Attorney, Agent, or Firm* — Wenderoth, Lind & Ponack, L.L.P.

(57) ABSTRACT

A data broadcast display device guarantees stereoscopic perception by the user of a displayed 3D data broadcast image, while alleviating the discomfort a user experiences due to a delay in display. The data broadcast display device includes a reception unit that receives object data for generating the left-view and right-view objects, a display data generation unit that generates the left-view and right-view objects using the received object data while providing notification upon completion of the generation of each object, and a display control unit that determines, at predetermined time intervals, whether the notification has been received for both the left-view and right-view objects, includes both the left-view and right-view objects in a data broadcast image for display when determining affirmatively, and includes neither the left-view nor the right-view object in the data broadcast image for display when determining negatively.

9 Claims, 24 Drawing Sheets

(51) Int. Cl.
*H04N 13/04* (2006.01)
*H04N 13/00* (2006.01)

(56) References Cited

U.S. PATENT DOCUMENTS

| | | |
|---|---|---|
| 2011/0037833 A1 | 2/2011 | Lee et al. |
| 2011/0064300 A1* | 3/2011 | Kobayashi .................... 382/154 |
| 2011/0090312 A1 | 4/2011 | Uchimura |
| 2011/0261159 A1 | 10/2011 | Mizobuchi et al. |
| 2012/0007962 A1* | 1/2012 | Takuma et al. ................. 348/51 |

FOREIGN PATENT DOCUMENTS

| | | |
|---|---|---|
| JP | 2006262397 | 9/2006 |
| JP | 2010-259052 | 11/2010 |
| JP | 2010-268432 | 11/2010 |
| WO | 2010/113731 | 10/2010 |
| WO | 2010/119815 | 10/2010 |
| WO | 2011/058704 | 5/2011 |

OTHER PUBLICATIONS

Data Coding and Transmission Specification for Digital Broadcasting, ARIB Standard, ARIB STD-B24, Version 5.4, vol. 2 (1/2) along with English translation.

Chinese Office Action and Search Report issued May 21, 2015 in corresponding Chinese Application No. 201280003557 (with English translation).

* cited by examiner

FIG. 12A

```
<bml>
 .
 .
 .
<body>
<p id=01 style="top:100;left:500;offset:2">
<![CDATA[JAPAN<br>AVC]]</p>
<p id=02 style="top:400;left:100;offset:4">
<![CDATA[3D data broadcast]]></p>
<img id=03
left_src="maru_L.png" right_src="maru_R.png"
style="top:100;left:100;offset:2"/>
<p id=04 style="top:100;left:100;offset:2">
<![CDATA[A]]></p>
</body>
</bml>
```

500, 501, 202, 203, 504

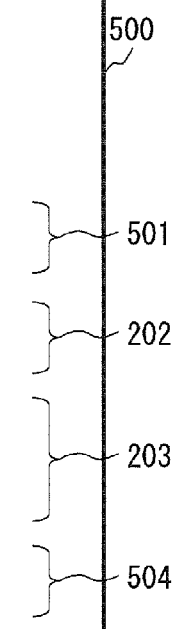

FIG. 12B

```
<bml>
 .
 .
 .
<body>
<p id=01 offset="2" style="top:100;left:500">
<![CDATA[JAPAN<br>AVC]]</p>
<p id=02 offset="4" style="top:400;left:100">
<![CDATA[3D data broadcast]]></p>
<img id=03 offset="2"
left_src="maru_L.png" right_src="maru_R.png"
style="top:100;left:100"/>
<p id=04 style="top:100;left:100;offset:2">
<![CDATA[A]]></p>
</body>
</bml>
```

510, 511, 212, 213, 514

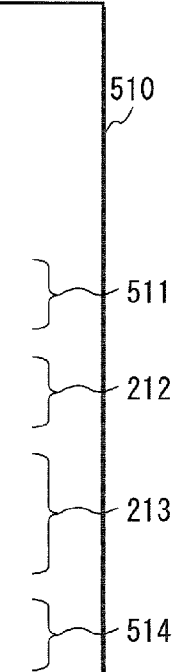

FIG. 13A

| Element name | Document index | top | left | type | value |
|---|---|---|---|---|---|
| p | 001 | 100 | 502 | Character string | JAPAN<br>AVC |
| p | 002 | 400 | 104 | Character string | 3D data broadcast |
| img | 003 | 100 | 102 | Still image | maru_L.png |
| p | 004 | 100 | 102 | Character string | A |

| Element name | Document index | top | left | type | value |
|---|---|---|---|---|---|
| p | 001 | 100 | 498 | Character string | JAPAN<br>AVC |
| p | 002 | 400 | 96 | Character string | 3D data broadcast |
| img | 003 | 100 | 98 | Still image | maru_R.png |
| p | 004 | 100 | 98 | Character string | A |

| Synchronization unit index | Element name | Document index | top | left | type | value |
|---|---|---|---|---|---|---|
| 001 | p | 001 | 100 | 502 | Character string | JAPAN |
| 002 | p | 001 | 300 | 502 | Character string | AVC |
| 003 | p | 002 | 100 | 104 | Character string | 3D |
| 004 | p | 002 | 100 | 304 | Character string | data broadcast |
| 005 | img | 003 | 100 | 102 | Still image | maru_L.png |
|  | p | 004 | 100 | 102 | Character string | A |

| Synchronization unit index | Element name | Document index | top | left | type | value |
|---|---|---|---|---|---|---|
| 001 | p | 001 | 100 | 498 | Character string | JAPAN |
| 002 | p | 001 | 300 | 498 | Character string | AVC |
| 003 | p | 002 | 100 | 96 | Character string | 3D |
| 004 | p | 002 | 100 | 296 | Character string | data broadcast |
| 005 | img | 003 | 100 | 98 | Still image | maru_R.png |
|  | p | 004 | 100 | 98 | Character string | A |

| Synchronization unit index | Creation status |
|---|---|
| 001 | Complete |
| 002 | Complete |
| 003 | Complete |
| 004 | Incomplete |
| 005 | Complete |

| Synchronization unit index | Creation status |
|---|---|
| 001 | Complete |
| 002 | Incomplete |
| 003 | Complete |
| 004 | Complete |
| 005 | Incomplete |

FIG. 23A

```
<bml>
 .
 .
 .
<body>
<p id="id01"style="top:100;left:502">        ┐
<![CDATA[JAPAN]]></p>                          ├─ 1201
<p id="id02"style="top:300;left:502">        ┐
<![CDATA[AVC]]></p>                            ├─ 1202
<p id="id03"style="top:400;left:104">        ┐
<![CDATA[3D data broadcast]]></p>              ├─ 1203
<img id="id04"  src="maru_L.png">            ┐
style="top:100;left:102/>                      ├─ 1204
</body>
</bml>
```
1200

FIG. 23B

```
<bml>
 .
 .
 .
<body>
<p id="id01"style="top:100;left:498">        ┐
<![CDATA[JAPAN]]></p>                          ├─ 1211
<p id="id02"style="top:300;left:498">        ┐
<![CDATA[AVC]]></p>                            ├─ 1212
<p id="id03"offset="4"style="top:400;left:98">┐
<![CDATA[3D data broadcast]]></p>              ├─ 1213
<img id="id04"  src="maru_R.png">            ┐
style="top:100;left:98/>                       ├─ 1214
</body>
</bml>
```
1210

FIG. 24A

```
<bml>
.
.
<script>
<![CDATA[
function bbb() {
browser.launch3dDocument("/40/0000/bbb01.bml",
"/40/0000/bbb02.bml","cut");
}
]]>
</script>
</body>
.
.
</body>
</bml>
```

FIG. 24B

```
<bml>
<3d view="left" link_bml="/40/0000/aaa02.bml">
.
.
<script>
<![CDATA[
function aaa() {
browser.launchDocument("/40/0000/bbb01.bml","cut");
}
]]>
</script>
</body>
.
.
</body>
</bml>
```

DATA BROADCAST DISPLAY DEVICE, DATA BROADCAST DISPLAY METHOD, AND DATA BROADCAST DISPLAY PROGRAM

This application claims benefit to the provisional U.S. Application 61/489,396, filed on May 24, 2011.

TECHNICAL FIELD

The present invention relates to technology for displaying 3D data broadcast images, and in particular to synchronous display of a left-view data broadcast image and a right-view data broadcast image.

BACKGROUND OF INVENTION

Background Art

In a data broadcast, unlike video images, data that is to be displayed at the receiving end by a data broadcast display device is repeatedly transmitted cyclically in units of modules. Such transmission does not take into account factors such as the timing of display at the receiving end. This may lead to the following problem for a data broadcast display device that displays 3D data broadcast images. When the time to display a data broadcast image is reached, and an object is to be placed in both a left-view data broadcast image and a right-view data broadcast image, it may be that while generation of the left-view object image is complete, generation of the right-view object image is not complete for some reason, such as a delay in acquisition of data. If the left-view data broadcast image and the right-view data broadcast image are inconsistent when displayed, the user will not be able to perceive the displayed image stereoscopically and will feel uncomfortable.

To address this problem, the technology disclosed in Patent Literature 1 achieves consistency between the left-view data broadcast image and the right-view data broadcast image by outputting the left-view data broadcast image and the right-view data broadcast image only when writing of both images to the graphics plane is complete.

CITATION LIST

Patent Literature

Patent Literature 1: Japanese Patent Application Publication No. 2010-259052

SUMMARY OF INVENTION

Displaying the left-view data broadcast image and the corresponding right-view data broadcast image only when both images are complete, as described above, does achieve consistency between the images. This leads to the problem, however, of nothing being displayed until both images are complete, which makes for an unpleasant viewing experience for the user.

In light of the above problems, it is an object of the present invention to provide a data broadcast display device that guarantees stereoscopic perception by a user of a displayed 3D data broadcast image, while alleviating the discomfort a user experiences due to a delay in display.

To solve the above problems, the present invention is a data broadcast display device for displaying a data broadcast image including a plurality of 3D objects each represented by a pair of a left-view object and a right-view object, comprising: a reception unit configured to receive object data for generating the left-view object and the right-view object; a display data generation unit configured to generate the left-view object and the right-view object for each of the plurality of 3D objects using the object data while providing notification upon completion of the generation of each left-view object and each right-view object; and a display control unit configured to determine, at predetermined time intervals, whether the notification has been received for both the left-view object and the right-view object for each of the plurality of 3D objects, to include both the left-view object and the right-view object in a data broadcast image for display when determining that the notification has been received, and to include neither the left-view object nor the right-view object in the data broadcast image for display when determining that the notification has not been received.

By providing the data broadcast display device of the present invention with the above structure, even if generation of at least one of the left-view object and the right-view object is not complete for any of the plurality of 3D objects, all of the 3D objects for which generation of both the left-view object and the right-view object is complete are placed in the data broadcast image and displayed. Therefore, this structure guarantees stereoscopic perception by the user of the displayed data broadcast image, while alleviating, as compared to conventional devices, the discomfort the user experiences due to a continued state in which no data broadcast image is displayed.

BRIEF DESCRIPTION OF DRAWINGS

FIGS. 12A and 12B illustrate examples of BML documents.

FIG. 13A illustrates an example of a left-view layout information table, and FIG. 13B illustrates an example of a right-view layout information table.

FIG. 14A illustrates an example of a single left-view layout information table, and FIG. 14B illustrates an example of a single right-view layout information table.

FIG. 16A illustrates an example of a left-view creation status table, and FIG. 16B illustrates an example of a right-view creation status table.

FIGS. 23A and 23B illustrate examples of BML documents.

FIGS. 24A and 24B illustrate examples of modified BML documents.

DETAILED DESCRIPTION OF INVENTION

Figure 1A:
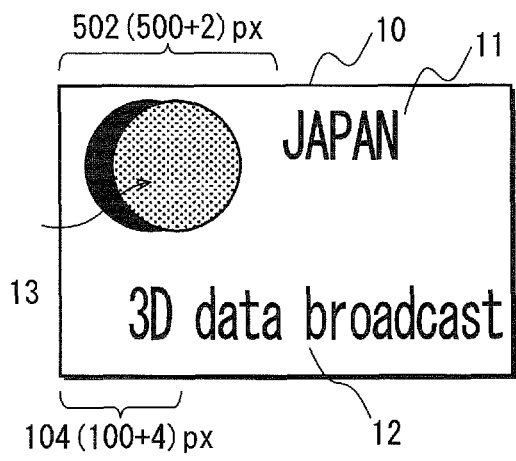
FIGS. 1A through 1C show an example of a data broadcast image that a data broadcast display device according to Embodiment 1 displays.

The following describes an embodiment of the present invention with reference to the drawings.

1. Embodiment 1

1.1 Outline

A data broadcast display device that is an embodiment of the present invention is a device for 3D display of data broadcast images. The data broadcast display device alternately displays a data broadcast image from the perspective of the left eye (hereinafter referred to as a "left-view data broadcast image") and a data broadcast image from the perspective of the right eye (hereinafter referred to as a "right-view data broadcast image"). In order to display an object for a user to perceive stereoscopically, the left-view data broadcast image includes an image of the object when viewed from the perspective of the left eye (hereinafter referred to as a "left-view object image"). The right-view data broadcast image includes an image of the object when viewed from the perspective of the right eye (hereinafter referred to as a "right-view object image"). The left-view object image and the right-view object image for one object are respectively placed in a left-view data broadcast image and a right-view data broadcast image with a horizontal shift with respect to each other, reflecting the user's binocular parallax. In this context, the term "object" refers to any sort of object. When the object is a character string, the character string is shown stereoscopically by being provided with depth and shading. Hereinafter, an object that is a stereoscopic character string is referred to as a "character string object".

The user views a right-view data broadcast image and a left-view data broadcast image displayed on the data broadcast display device by wearing special glasses. The special glasses are controlled by the data broadcast display device so that the lens for the right eye blocks light when the data broadcast display device is displaying a left-view data broadcast image, whereas the lens for the left eye blocks light when the data broadcast display device is displaying a right-view data broadcast image. Since the special glasses are controlled in this way, the afterimage effect allows a user's brain to perceive overlap between the left-view data broadcast image and the right-view data broadcast image, which reflect parallax. As a result, the user perceives a stereoscopic object as being located in front of the user.

The data in the data broadcast for generating the left-view object image, the right-view object image, and the like is repeatedly transmitted cyclically in units of modules, unlike video images. Such transmission does not take into account factors such as the timing of display by the data broadcast display device. Therefore, generation of the left-view object image is not always synchronous with generation of the right-view object image in the data broadcast display device. At the time at which the data broadcast image is to be displayed, it may be the case that generation of the left-view object image is complete, whereas generation of the right-view object image is not yet complete. In this case, the left-view data broadcast image and the left-view data broadcast image are inconsistent, since the left-view object image is placed in the left-view data broadcast image, whereas the right-view object image corresponding to the left-view object image is not placed in the right-view data broadcast image. If the data broadcast display device displays the left-view data broadcast image and the left-view data broadcast image in such an inconsistent state, the user will not be able to perceive the object stereoscopically.

The data broadcast display device of the present embodiment only places the left-view object image and the right-view object image in the left-view data broadcast image and the right-view data broadcast image, respectively, when generation of both the left-view object image and the right-view object image that correspond to an object is complete. When generation of at least one of the left-view object image and the right-view object image is not complete, the data broadcast display device places neither the left-view object image nor the right-view object image in the respective left-view data broadcast image and right-view data broadcast image, thereby avoiding the display of images in the above-described inconsistent state.

Specific Example of Data Broadcast Image

Figure 1B:
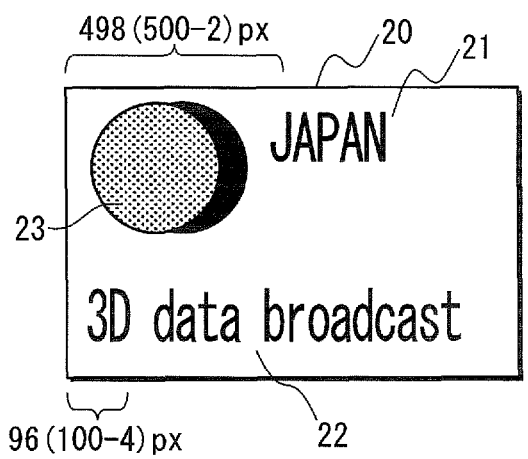
Figure 1C:
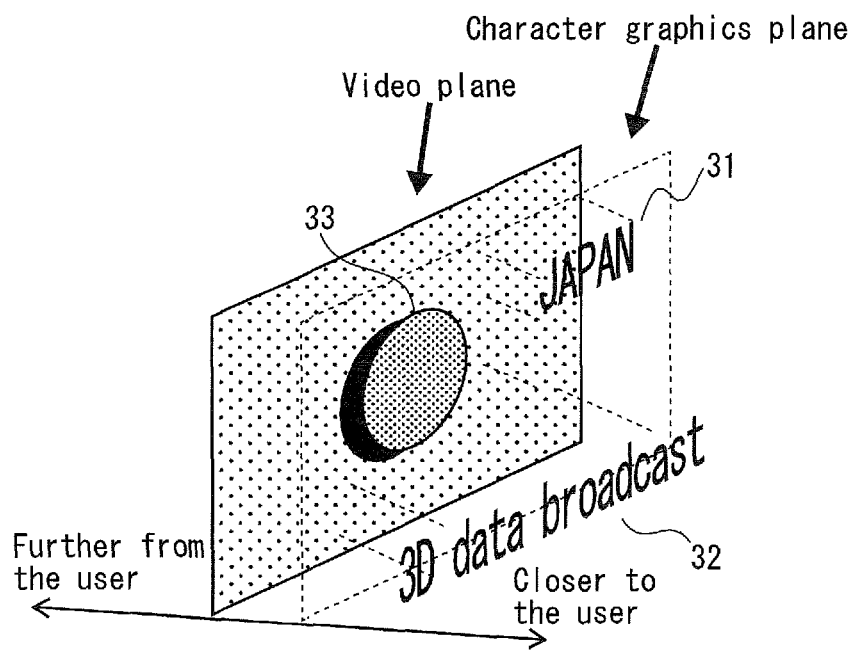

FIGS. 1A through 1C show an example of a data broadcast image that the data broadcast display device displays.

FIG. 1A schematically illustrates a left-view data broadcast image 10. The left-view data broadcast image 10 includes a left-view object image 11 that displays the character string "JAPAN", a left-view object image 12 that displays the character string "3D data broadcast", and a left-view object image 13 that displays a shaded circular graphic.

FIG. 1B schematically illustrates a right-view data broadcast image 20. The right-view data broadcast image 20 includes a right-view object image 21 that displays the character string "JAPAN", a right-view object image 22 that displays the character string "3D data broadcast", and a right-view object image 23 that displays a shaded circular graphic.

In an XY coordinate plane having the upper-left corner of the left-view data broadcast image 10 as the origin, a horizontal X-axis, a vertical Y-axis, and coordinates in units of pixels (px), the left-view object image 11 is placed at an X coordinate of 502 px. On the other hand, in an XY coordinate plane having the upper-left corner of the right-view data broadcast image 20 as the origin, a horizontal X-axis, a vertical Y-axis, and coordinates in units of px, the right-view object image 21, which represents the same object as the left-view object image 11, is placed at an X coordinate of 498 px. In other words, the left-view object image 11 and the right-view object image 21 are horizontally shifted four pixels with respect to each other. Similarly, the left-view object image 12 and the corresponding right-view object image 22 are horizontally shifted eight pixels with respect to each other. The left-view object image 13 and the corresponding right-view object image 23 are horizontally shifted four pixels with respect to each other. Additionally, the circular graphics are shaded differently so that the user will perceive the images stereoscopically. The left-view data broadcast image 10 and the right-view data broadcast image 20 are displayed alternately by the data broadcast display device. The user, who views these images with the special glasses, perceives the following objects as being closer to the user than the screen: an object 31 represented by the left-view object image 11 and the right-view object image 21, an object 32 represented by the left-view object image 12 and the right-view object image 22, and an object 33 represented by the left-view object image 13 and the right-view object image 23.

An example of the above inconsistency is when the left-view object images 11-13 and the right-view object images 21 and 22 in FIG. 1 are complete, whereas the right-view object image 23 in FIG. 1 is not complete.

1.2 Structure

Figure 2:
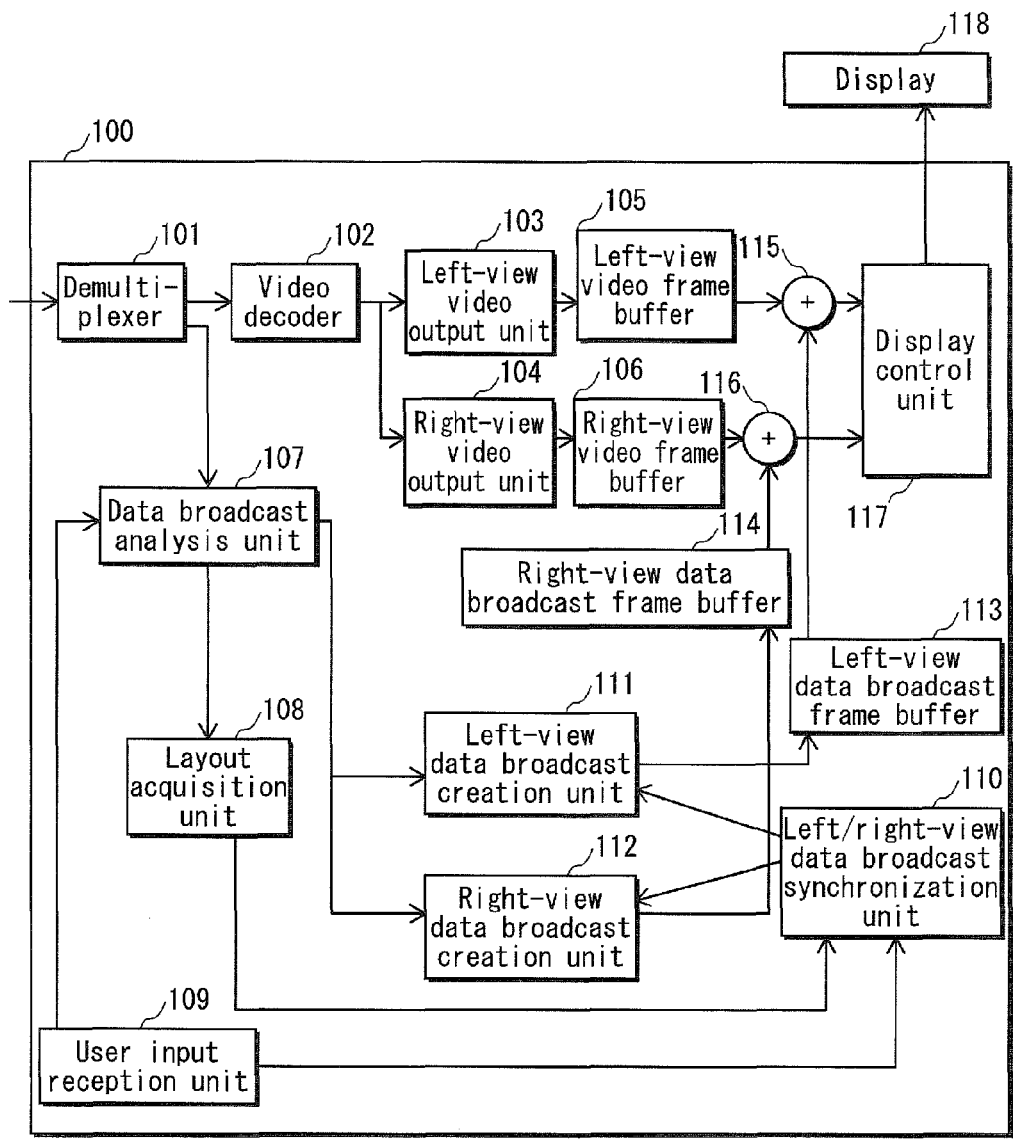
FIG. 2 is a block diagram illustrating the structure of the data broadcast display device.

FIG. 2 is a block diagram illustrating the structure of the data broadcast display device that is an embodiment of the present invention.

The data broadcast display device 100 includes a demultiplexer 101, a video decoder 102, a left-view video output unit 103, a right-view video output unit 104, a left-view video frame buffer (FB) 105, a right-view video FB 106, a data broadcast analysis unit 107, a layout acquisition unit 108, a user input reception unit 109, a left/right-view data broadcast synchronization unit 110, a left-view data broadcast creation unit 111, a right-view data broadcast creation unit 112, a left-view data broadcast FB 113, a right-view data broadcast FB 114, a left-view display generation unit 115, a right-view display generation unit 116, a display control unit 117, and a display 118.

The demultiplexer 101 has a function to acquire a transport stream in which a plurality of programs have been multiplexed and to extract, from the acquired transport stream, video, audio, and data broadcast packets for a program selected by the user via a user input unit 109. The demultiplexer 101 outputs extracted video packets to the video decoder 102, outputs extracted audio packets to an audio decoder not shown in the figures, and outputs extracted data broadcast packets to the data broadcast analysis unit 107. Note that video transmitted via the transport stream is coded in accordance with the MPEG4-MVC (Moving Picture Experts Group 4—Multiview Video Coding) format.

The video decoder 102 has a function to acquire video packets and to acquire left-view video and right-view video by decoding the video packets. The video decoder 102 outputs acquired left-view video to the left-view video output unit 103 and outputs acquired right-view video to the right-view video output unit 104.

The left-view video output unit 103 has a function to acquire left-view video from the video decoder 102 and to write, into the left-view video FB 105, each of the left-view images constituting the left-view video at the time indicated by the PTS (Presentation Time Stamp) attached to the left-view image.

The right-view video output unit 104 has a function to acquire right-view video from the video decoder 102 and to write, into the right-view video FB 106, each of the right-view images constituting the right-view video at the time indicated by the PTS attached to the right-view image.

The left-view video FB 105 is a frame buffer (hereinafter referred to as an "FB") constituted by memory and stores left-view images output by the left-view video output unit 103.

The right-view video FB 106 is a frame buffer constituted by memory and stores right-view images output by the right-view video output unit 104.

The data broadcast analysis unit 107 has a function to acquire data broadcast packets from the demultiplexer 101, to extract a BML document (startup.bml) from the acquired data broadcast packets, and to output startup.bml to the layout acquisition unit 108. The data broadcast analysis unit 107 also has a function to analyze startup.bml, extract a file with a file name indicated by a left_src attribute value in an img element, output the extracted file to the left-view data broadcast creation unit 111, extract a file with a file name indicated by a right_src attribute value in the img element, and output the extracted file to the right-view data broadcast creation unit 112.

Figure 3:
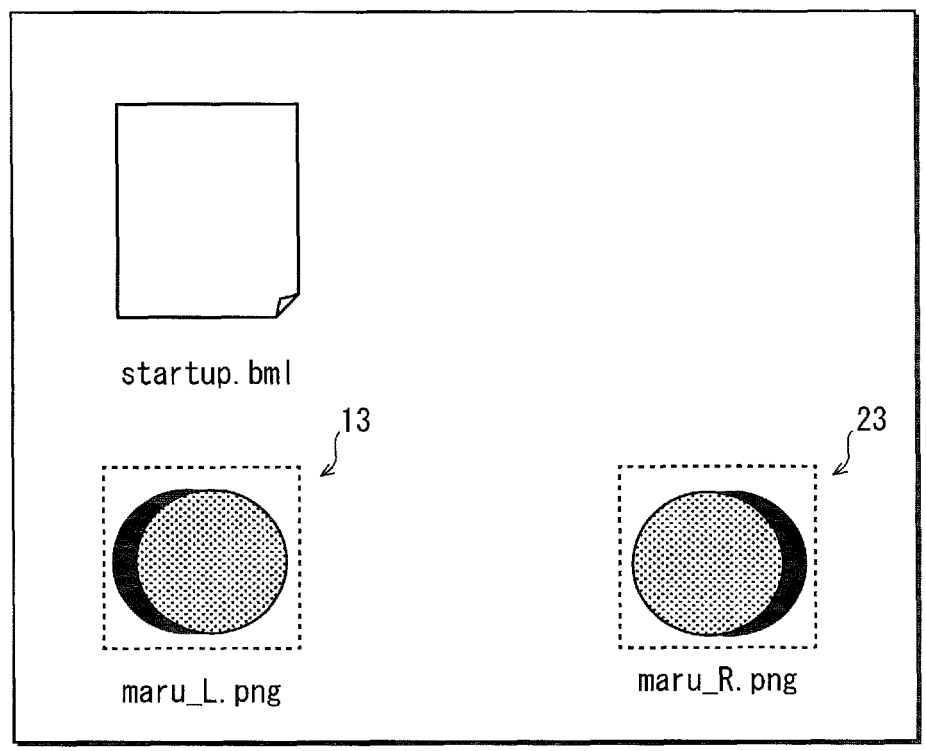
FIG. 3 illustrates an example of resources necessary to create data broadcast images.

FIG. 3 illustrates an example of resources necessary to create data broadcast images.

In the present embodiment, resources necessary for creation of a data broadcast image are startup.bml, maru_L.png, which is described in the BML document as a resource necessary for creation of the left-view data broadcast image, and maru_R.png, which is described in the BML document as a resource necessary for creation of the right-view data broadcast image.

Figure 4A:
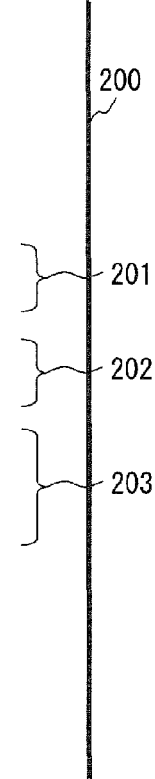
FIGS. 4A and 4B illustrate examples of BML documents.

FIG. 4A is an extract of startup.bml, which is an example of a BML document, showing the portion pertaining to the present embodiment. The description in the BML document of the present disclosure is, as a general rule, in accordance with ARIB STD-B24. The description pertaining to objects, however, is extended as described in (1) and (2) below.

(1) First, an offset attribute is added to each element tag (201-203, 211-213). The units of an offset value set within the offset attribute are in pixels. Each element tag represents information on one object. The offset value indicates how many pixels to horizontally shift the X coordinate of the layout position of the object that corresponds to the element tag, indicating a shift to the right in the left-view data broadcast image and a shift to the left in the right-view data broadcast image. By shifting the layout position of the object to the left or right in the left-view data broadcast image and in the right-view data broadcast image, the object is perceived stereoscopically by the user, as described above. Note that when the value of the offset is negative, the object is shifted in the opposite direction as when the value is positive. Specifically, the position of the object is shifted horizontally to the left in the left-view data broadcast image and horizontally to the right in the right-view data broadcast image.

For example, in the case of FIG. 4A, the offset value for the p element (201) is 2, and the left value is 500. Accordingly, the X coordinate of the object represented by the p element (201) is 502 px in the right-view data broadcast image and is 498 px in the left-view data broadcast image.

(2) A left_src attribute and a right_src attribute are added to the img element to allow for more stereoscopic presentation of one object in the left-view data broadcast image and the right-view data broadcast image by using different bitmaps. The attribute value of the left_src attribute is the file name of a bitmap representing the left-view object image. The attribute value of the right_src attribute is the file name of a bitmap representing the right-view object image. In the case of the img element (203) in FIG. 4A, the attribute value for the left_src attribute is maru_L.png, and the attribute value for the right_src attribute is maru_R.png. In other words, for the object corresponding to the img element (203), the left-view object image is maru_L.png, and the right-view object image is maru_R.png.

The layout acquisition unit 108 has a function to acquire startup.bml as the BML document, analyze startup.bml, and generate layout information indicating the layout of the left-view object image within the left-view data broadcast image (hereinafter referred to as "left-view layout information") and layout information indicating the layout of the right-view object image within the right-view data broadcast image (hereinafter referred to as "right-view layout information"). The layout acquisition unit 108 outputs the generated left-view layout information and right-view layout information to the left/right-view data broadcast synchronization unit 110. The layout acquisition unit 108 updates the left-view layout information and the right-view layout information as necessary, such as when a different BML document is acquired.

The left-view layout information is composed of the following entries: element name, document index, top, left, type, and value. For each element tag in the acquired BML document, the layout acquisition unit 108 records the element name, the value indicated by the top attribute (hereinafter referred to as the "top attribute value"), and the value indicated by the left attribute (hereinafter referred to as the "left attribute value") respectively in the element name, top, and left entries in the left-view layout information. The units for the top and left entries are pixels. When an offset value is set in an element tag of the BML document, the value recorded for the left entry in the left-view layout information is the left attribute value after addition of the value indicated by the offset attribute (hereinafter referred to as the "offset attribute value"). The layout acquisition unit 108 lists the id value assigned to an element tag as the document index of the left-view layout information. The document index is used to identify the left-view layout information as well as the left-view object image and the like indicated by the left-view layout information. The type indicates the type of the left-view object. In the present embodiment, there are two types: a character string, and a still image. Specifically, if an element tag in the BML document includes a CDATA section, then the type of the left-view layout information is a "character string", and if the left_src attribute and right_src attribute are included, then the type is listed as a "still image". The value entry indicates the content of the left-view object. Specifically, if the type is a character string, then the value entry lists the actual character string described in the CDATA section. On the other hand, if the type is a still image, then the value entry lists the file names that are the attribute values of the left_src attribute and the right_src attribute in the element tag of the BML document.

Additionally, for elements that can have text as the element value, such as a p element, the type of the left-view layout information is described as a "character string", and the value entry describes the actual character string of the element value (in the case of a p element, the section between <p> and </p>).

The layout acquisition unit 108 generates layout information under the assumption that one object can be generated from the character string listed in the CDATA section and one object from the image files indicated in the img element tag.

Figure 5A:
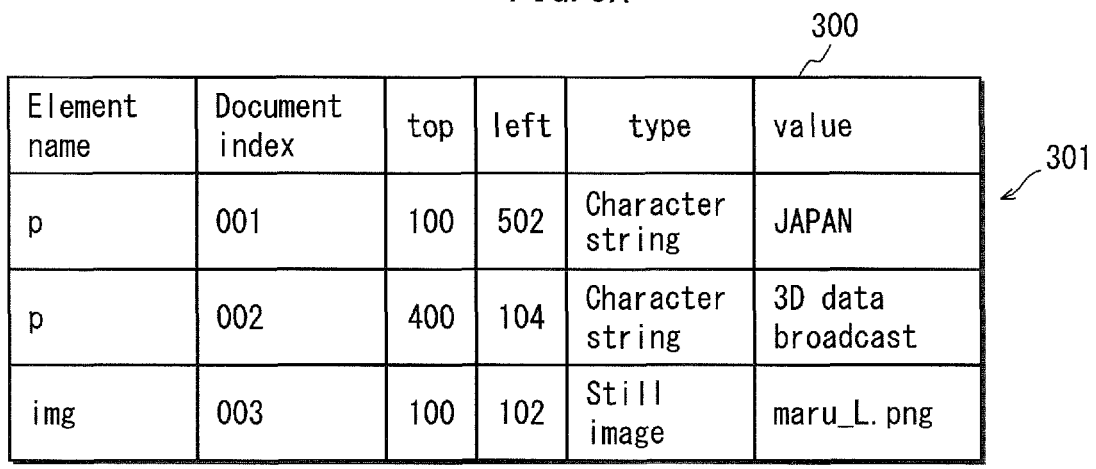
FIG. 5A illustrates an example of a left-view layout information table.

FIG. 5A illustrates an example of a left-view layout information table, which lists left-view layout information.

The left-view layout information 301 is generated based on the element tag 201 in the BML document of FIG. 4A and is layout information regarding a left-view object image representing a character string. The left-view layout information 301 lists a "p" for the element name, "001" for the document index, "100" for the top entry, "502" for the left entry, "character string" for the type, and "JAPAN" for the value. Since the element tag 201 includes an offset attribute, "502" is recorded for the left entry, which equals the left attribute value of 500 plus the offset attribute value of 2.

The description of the right-view layout information is similar to the description of the left-view layout information. In the case of the right-view layout information, however, when an element tag in the BML document includes an offset value, then the value listed for the left entry in the right-view layout information is the value indicated by the left attribute minus the value indicated by the offset attribute.

Figure 5B:
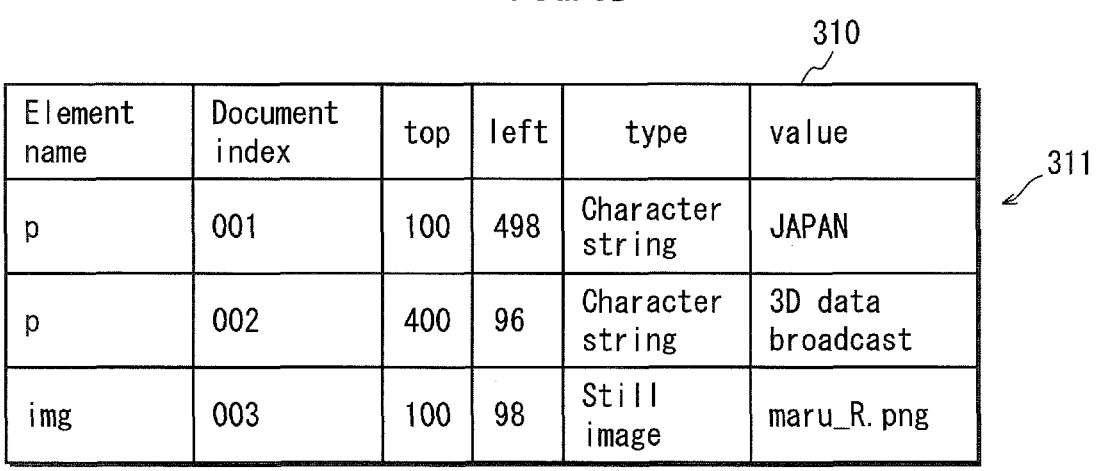
FIG. 5B illustrates an example of a right-view layout information table.

FIG. 5B illustrates an example of a right-view layout information table, which lists right-view layout information. For example, the right-view layout information 311 is generated based on the element tag 201 in the BML document of FIG. 4A and is layout information regarding a right-view object image representing the same object as the left-view layout information 301. The right-view layout information 311 lists a "p" for the element name, "001" for the document index, "100" for the top entry, "character string" for the type, and "JAPAN" for the value. The element tag 201 includes an offset attribute, and therefore "498" is recorded for the left entry, which equals the left attribute value of 500 minus the offset attribute value of 2.

The left-view data broadcast FB 113 is a FB constituted by memory and stores left-view object images. The stored left-view object images are output to the left-view display generation unit 115 based on control by the left/right-view data broadcast synchronization unit 110.

The right-view data broadcast FB 114 is a FB constituted by memory and stores right-view object images. The stored right-view object images are output to the right-view display generation unit 116 based on control by the synchronous data control unit 110.

The left-view display generation unit 115 has a function to generate a left-view data broadcast image by overlaying the left-view object images output by the left-view data broadcast FB 113. The left-view display generation unit 115 also has a function to overlay the left-view data broadcast image onto a left-view image output by the left-view video FB 105 and output the result to the display control unit 117.

The right-view display generation unit 116 has a function to generate a right-view data broadcast image by overlaying the right-view object images output by the right-view data broadcast FB 114. The right-view display generation unit 116 also has a function to overlay the right-view data broadcast image onto a right-view image output by the right-view video FB 106 and output the result to the display control unit 117.

The left-view data broadcast creation unit 111 acquires the left-view layout information table from the left/right-view data broadcast synchronization unit 110. The left-view data broadcast creation unit 111 also acquires the resources necessary for creating a left-view data broadcast image (in this embodiment, maru_L.png) from the data broadcast analysis unit 107. The left-view data broadcast creation unit 111 uses the left-view layout information table and the acquired resources to generate the left-view object image. The left-view data broadcast creation unit 111 reserves an amount of FB in the left-view data broadcast FB 113 for one left-view data broadcast image corresponding to one piece of left-view layout information and stores the generated left-view object image in the reserved FB. Upon completion of generation of each left-view object image, the left-view data broadcast creation unit 111 provides the left/right-view data broadcast synchronization unit 110 with a completion notification to indicate the completion of the left-view object image. The completion notification includes the document index of the completed left-view object image so as to identify the left-view object image whose generation is complete.

The following describes steps for the left-view data broadcast creation unit 111 to generate a left-view object image.

The left-view data broadcast creation unit 111 refers in order to the pieces of left-view layout information in the left-view layout information table. When the type in the left-view layout information is a character string, the left-view data broadcast creation unit 111 performs predetermined processing to make the character string stereoscopic, such as providing depth and shading, thus generating a left-view object image by converting the character string into a bit map. When the type in the left-view layout information is a still image, the left-view data broadcast creation unit 111 uses the resource identified by the file name listed in the value entry and acquired from the data broadcast analysis unit 107 as the left-view object image.

The left-view data broadcast creation unit 111 stores the generated left-view object image in the reserved FB of the left-view data broadcast FB 113 at a position corresponding to the X coordinate of the left-view data broadcast image indicated by the left entry and the Y coordinate indicated by the top entry.

The right-view data broadcast creation unit 112 acquires the right-view layout information table from the left/right-view data broadcast synchronization unit 110. The right-view data broadcast creation unit 112 also acquires the resources necessary for creating a right-view data broadcast image (in this embodiment, maru_R.png) from the data broadcast analysis unit 107. The right-view data broadcast creation unit 112 uses the right-view layout information table and the acquired resources to generate the right-view object image. The right-view data broadcast creation unit 112 reserves an amount of FB in the right-view data broadcast FB 114 for one right-view data broadcast image corresponding to one piece of right-view layout information and stores the generated right-view object image in the reserved FB. Upon completion of generation of each right-view object image, the right-view data broadcast creation unit 112 provides the left/right-view data broadcast synchronization unit 110 with a completion notification to indicate the completion of the right-view object image. The completion notification includes the document index of the completed right-view object image so as to identify the right-view object image whose generation is complete.

Generation of the right-view object image and storage in the right-view data broadcast FB 114 by the right-view data broadcast creation unit 112 are similar to generation of the left-view object image and storage in the left-view data FB 113 by the left-view data broadcast creation unit 111. Therefore, a description of the generation and storage is omitted here.

The left/right-view data broadcast synchronization unit 110 acquires the left-view layout information and the right-view layout information from the layout acquisition unit 108 and generates a left-view creation status table and a right-view creation status table listing whether creation of the left-view object image and the right-view object image represented by each piece of left-view layout information and right-view layout information is complete or incomplete. The left/right-view data broadcast synchronization unit 110 also outputs the left-view layout information table and the right-view layout information table, acquired from the layout acquisition unit 108, to the left-view data broadcast creation unit 111 and the right-view data broadcast creation unit 112 respectively.

The following describes the left-view creation status table and the right-view creation status table.

Figure 7A:
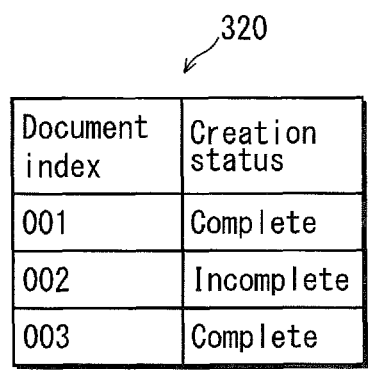
FIG. 7A illustrates an example of a left-view creation status table.

FIG. 7A illustrates a left-view creation status table 320.

Each line of the left-view creation status table is composed of a document index and a creation status. The document index matches the document index of the left-view layout information. Therefore, the creation status in each line of the left-view creation status table corresponds to the piece of left-view layout information with the same document index as the document index in the line of the creation status. The initial value of the creation status in the left-view creation status table is "incomplete", which indicates incompletion. Upon receiving a completion notification from the left-view data broadcast creation unit 111, the left/right-view data broadcast synchronization unit 110 sets the creation status identified by the document index included in the completion notification to "complete" in the left-view creation status table.

Figure 7B:
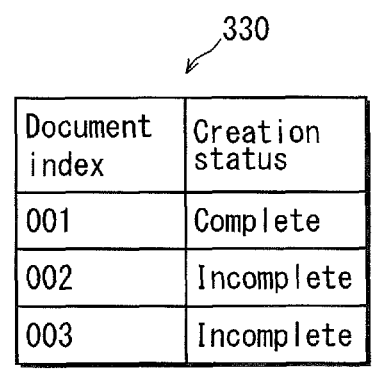
FIG. 7B illustrates an example of a right-view creation status table.

FIG. 7B illustrates an example of a right-view creation status table. The description of the right-view creation status table is similar to that of the left-view creation status table and is therefore omitted.

The left/right-view data broadcast synchronization unit 110 also performs control to cause the left-view display generation unit 115 to output the left-view object image stored in the left-view data broadcast FB 113 and cause the right-view display generation unit 116 to output the right-view object image stored in the right-view data broadcast FB 114 at predetermined intervals (for example, at intervals synchronized with the refresh interval of the display 118).

Specifically, during this control the left/right-view data broadcast synchronization unit 110 searches the left-view creation status table and the right-view creation status table for creation statuses that correspond to the same document index value and that are both "complete". When both creation statuses are "complete", the left/right-view data broadcast synchronization unit 110 causes the left-view display generation unit 115 to output the left-view object image that corresponds to the document index and is stored in the left-view data broadcast FB 113. The left/right-view data broadcast synchronization unit 110 also causes the right-view display generation unit 116 to output the right-view object image that corresponds to the document index and is stored in the right-view data broadcast FB 114.

If at least one of the creation statuses corresponding to the same document index value in the left-view creation status table and the right-view creation status table is not "complete", the left/right-view data broadcast synchronization unit 110 neither causes the left-view display generation unit 115 to output the left-view object image corresponding to the document index nor causes the right-view display generation unit 116 to output the right-view object image corresponding to the document index.

The user input reception unit 109 is provided with an input device, such as a remote control or input keys, and receives user input via the input device. In response to user input, the user input reception unit 109 outputs an instruction to a predetermined other unit based on the content of the user input.

The display control unit 117 acquires an image from the left-view display generation unit 115 and from the right-view display generation unit 116, alternately displaying these images on the display 118 at predetermined times (for example, at times synchronized with the refresh rate of the display 118).

The display 118 is a display device, such as a liquid crystal display, for displaying data broadcast images.

1.3 Operations

The following describes processing to output left/right-view data broadcast images by the data broadcast display device 100 provided with the above structure.

Figure 9:
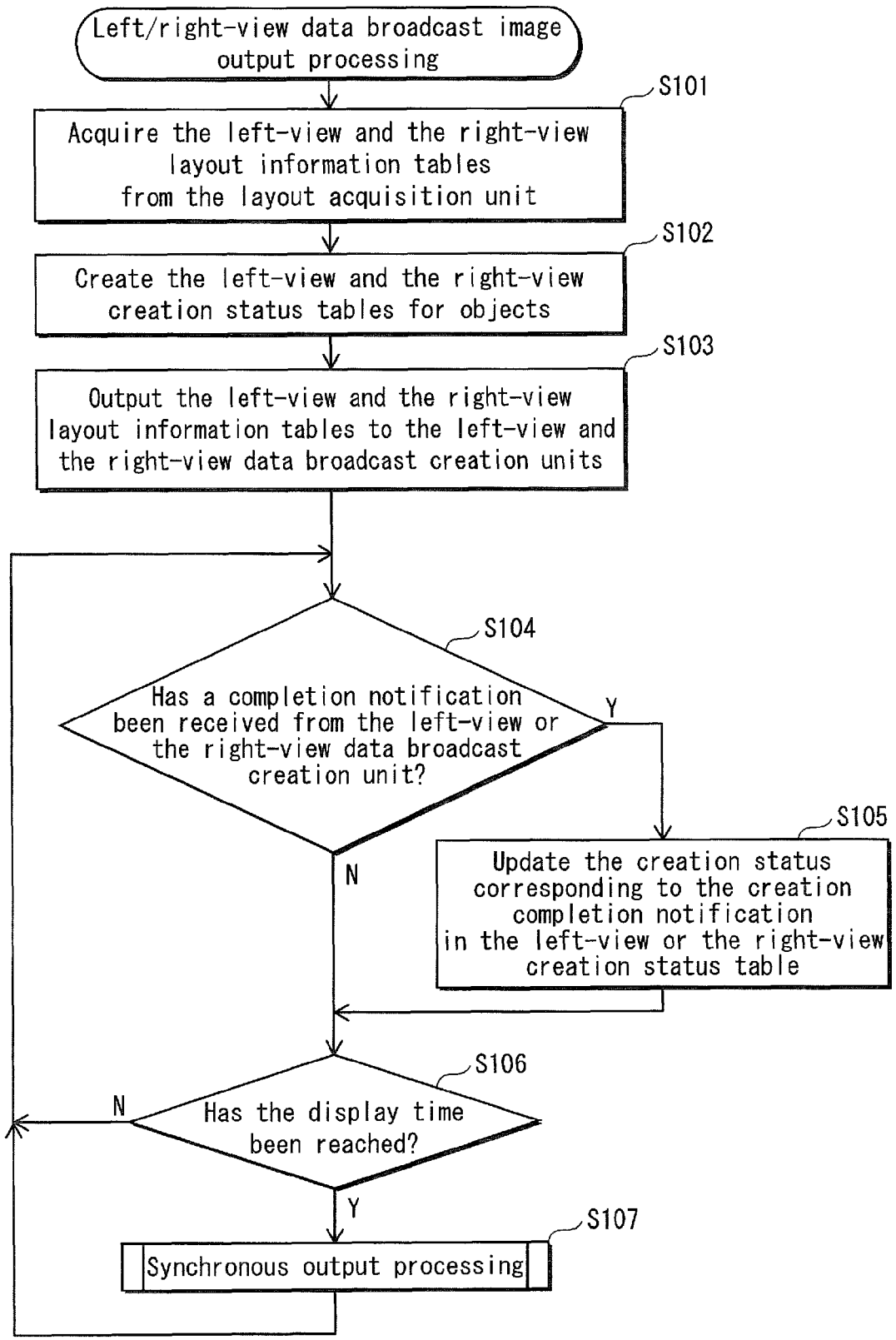
FIG. 9 is a flowchart showing processing to output left/right-view data broadcast images.

FIG. 9 is a flowchart showing processing to output left/right-view data broadcast images.

First, the left/right-view data broadcast synchronization unit 110 acquires the left-view layout information table and the right-view layout information table from the layout acquisition unit 108 (S101).

Based on the left-view layout information table and the right-view layout information, the left/right-view data broadcast synchronization unit 110 creates the left-view creation status table and the right-view creation status table (S102).

Next, the left/right-view data broadcast synchronization unit 110 outputs the generated left-view layout information table to the left-view data broadcast creation unit 111 and the right-view layout information table to the right-view data broadcast creation unit 112 (S103).

The left/right-view data broadcast synchronization unit 110 then waits for a completion notification for the left-view object image and for the right-view object image from the left-view data broadcast creation unit 111 and the right-view data broadcast creation unit 112 (S104).

Upon receiving a completion notification from the left-view data broadcast creation unit 111 (S104: Y), the left/right-view data broadcast synchronization unit 110 sets the creation status identified by the document index included in the completion notification to "complete" in the left-view creation status table. Upon receiving a completion notification from the right-view data broadcast creation unit 112, the left/right-view data broadcast synchronization unit 110 sets the creation status identified by the document index included in the completion notification to "complete" in the right-view creation status table (S105). Processing then proceeds to step S106.

Next, the left/right-view data broadcast synchronization unit 110 determines whether a predetermined display time has been reached (S106). If the predetermined display time has not been reached, processing proceeds to S104. Otherwise, synchronous output is performed (S107), and processing then proceeds to S104.

Figure 10:
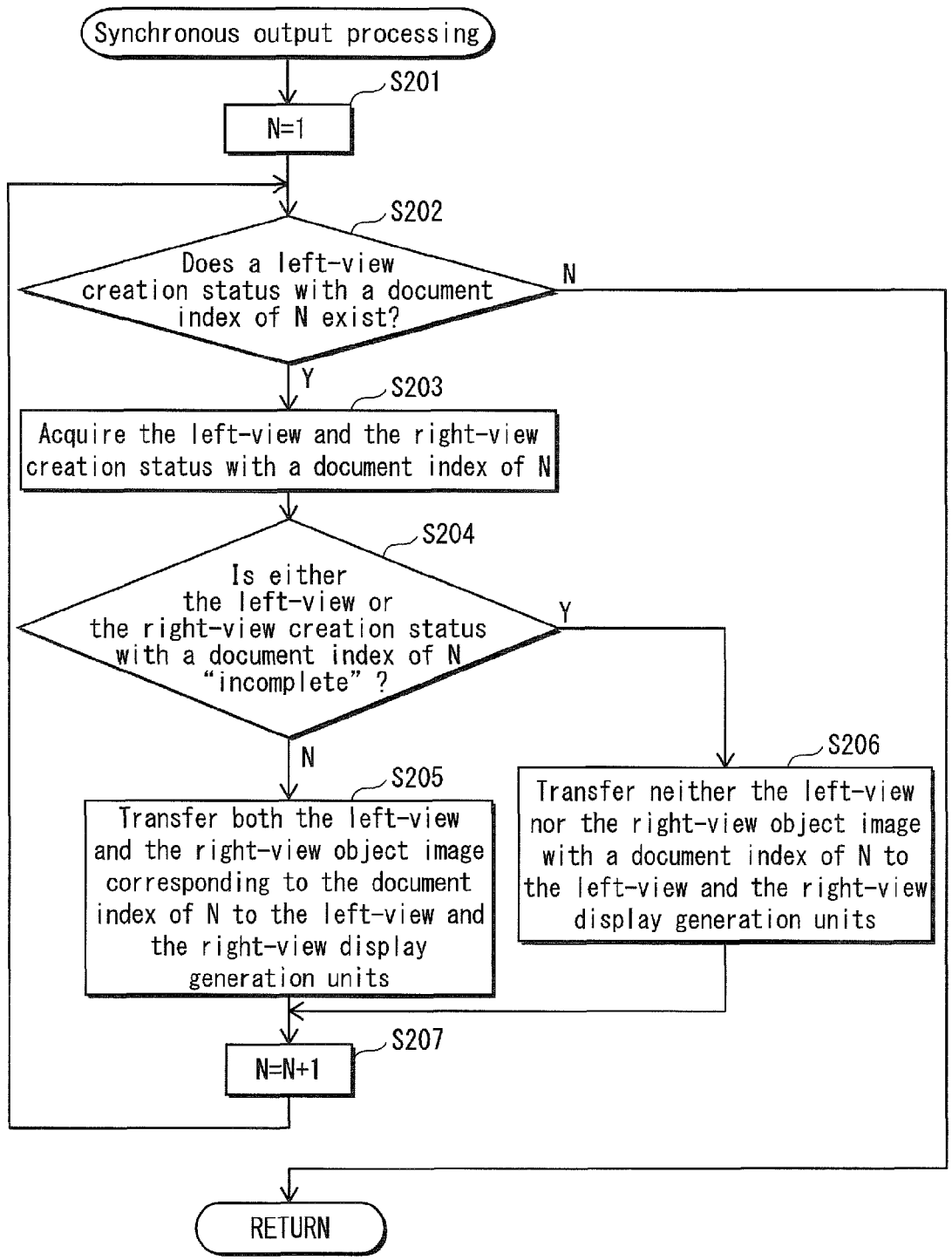
FIG. 10 is a flowchart showing processing for synchronous output.

FIG. 10 shows details on the synchronous output processing of S107.

FIG. 10 is a flowchart showing synchronous output processing by the left/right-view data broadcast synchronization unit 110.

First, the left/right-view data broadcast synchronization unit 110 assigns a variable N a value of 1 (S201). The variable N indicates the target document index. Next, the left/right-view data broadcast synchronization unit 110 determines whether a left-view creation status and a right-view creation status whose document index matches N exist in the left-view creation status table and the right-view creation status table (S202). If the creation statuses exist (S202: Y), the left/right-view data broadcast synchronization unit 110 reads the creation statuses whose document index matches N from the left-view creation status table and the right-view creation status table (S203).

The left/right-view data broadcast synchronization unit 110 then determines whether either of the read creation statuses is "incomplete" (S204). If either is "incomplete" (S204: Y), then the left/right-view data broadcast synchronization unit 110 causes the left-view display generation unit 115 and the right-view display generation unit 116 not to output either of the left-view object image or the right-view object image corresponding to the document index (S206). On the other hand, if neither of the creation statuses is "incomplete", i.e. if both are "complete" (S204: N), then the left/right-view data broadcast synchronization unit 110 causes both the left-view display generation unit 115 and the right-view display generation unit 116 respectively to output the left-view object image and the right-view object image corresponding to the document index (S205). The left/right-view data broadcast synchronization unit 110 then increments N by one and proceeds to S202, repeating the above steps until no left-view creation status or right-view creation status whose document index matches N remains in the left-view creation status table and the right-view creation status table.

1.4 Example of Generation of Left-View Data Broadcast Image and Right-View Data Broadcast Image Example when every creation status in the left-view creation status table and the right-view creation status table is "complete"

The following describes an example of the data broadcast images created when every creation status in the left-view creation status table and the right-view creation status table is "complete".

Figure 6A:
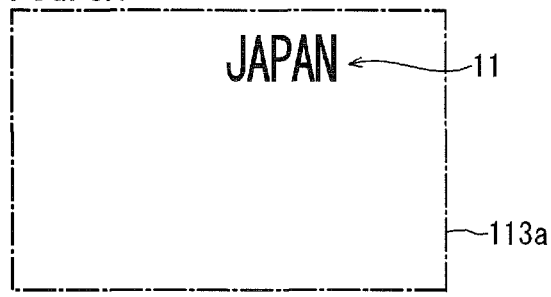
FIGS. 6A through 6C schematically illustrate left-view object images recorded in a FB.
Figure 6E:
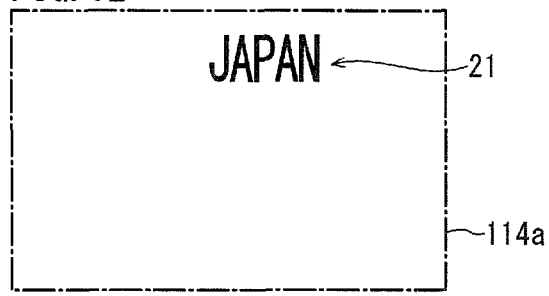
FIGS. 6E through 6G schematically illustrate right-view object images recorded in a FB.
Figure 6B:
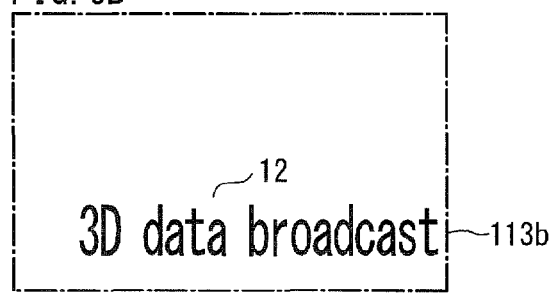
Figure 6F:
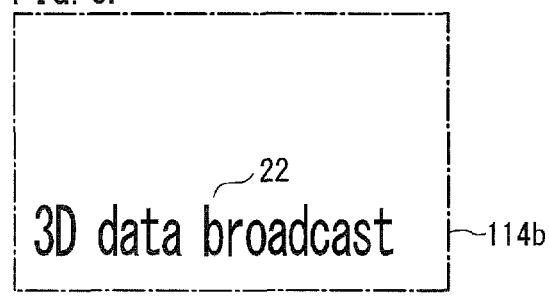
Figure 6C:
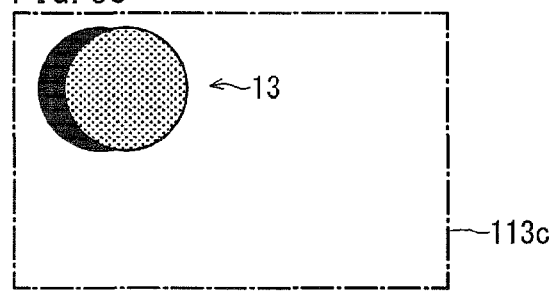

FIGS. 6A through 6C schematically illustrate the left-view object images stored in the FB reserved within the left-view data broadcast FB 113 in association with pieces of left-view layout information.

FB113*a* through FB113*c* correspond to document indices 001 through 003.

FIG. 6A schematically illustrates how the left-view object image 11 is stored in the FB113*a*, which is reserved in association with the piece of left-view layout information whose document index is 001. FIGS. 6B and 6C schematically illustrate how the left-view object images 12 and 13 are stored in the FB113*b* and the FB113*c*, which are reserved in association with the pieces of left-view layout information whose document index is 002 and 003, respectively.

Figure 6G:
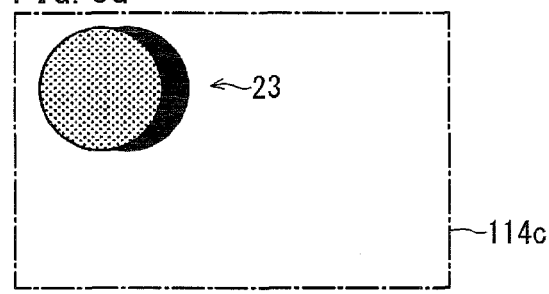
Figure 6D:
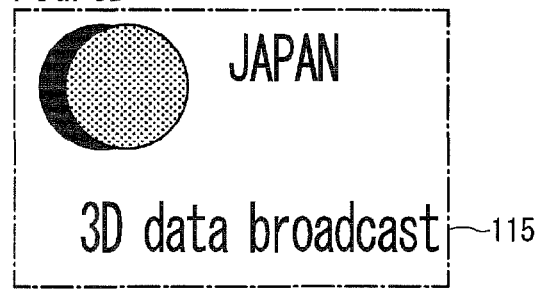
FIG. 6D schematically illustrates a left-view data broadcast image.

Once the images shown in FIGS. 6A through 6C are output to the left-view display generation unit 115, the left-view display generation unit 115 overlays these images to generate a left-view data broadcast image as shown in FIG. 6D.

FIGS. 6E through 6G schematically illustrate the right-view object images stored in the FB reserved within the right-view data broadcast FB 114 in association with pieces of right-view layout information. FIG. 6E schematically illustrates how the right-view object image 21 is stored in the FB114*a*, which is reserved in association with the piece of right-view layout information whose document index is 001. FIGS. 6F and 6G schematically illustrate how the right-view object images 22 and 23 are stored in the FB114*b* and the FB114*c*, which are reserved in association with the pieces of right-view layout information whose document index is 002 and 003, respectively.

Figure 6H:
FIG. 6H schematically illustrates a right-view data broadcast image.

Once the images shown in FIGS. 6E through 6G are output to the right-view display generation unit 116, the right-view display generation unit 116 overlays these images to generate a right-view data broadcast image as shown in FIG. 6H.

Example when the left-view creation status table and the right-view creation status table are as in FIGS. 7A and 7B The following describes an example of the data broadcast images created when the left-view creation status table and the right-view creation status table are as in FIGS. 7A and 7B.

Figure 8A:
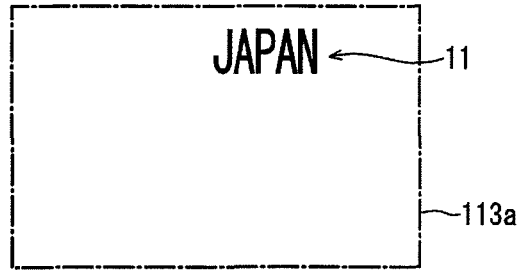
FIGS. 8A through 8C schematically illustrate left-view object images recorded in a FB.
Figure 8E:
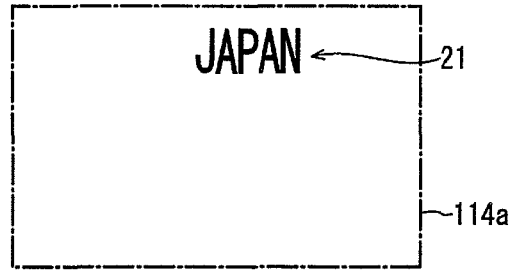
FIGS. 8E through 8G schematically illustrate right-view object images recorded in a FB.
Figure 8B:
Figure 8F:
Figure 8C:
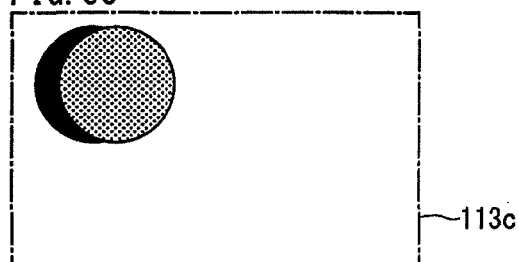

FIGS. 8A through 8C schematically illustrate the left-view object images stored in the FB113a through FB113c when the left-view creation status table is as in FIG. 7A.

FB113a through FB113c correspond to document indices 001 through 003.

The creation status corresponding to the document index 001 in FIG. 7A is "complete". In this case, as shown in FIG. 8A, the left-view object image 11 is stored in the FB113a, as in the case of FIG. 6A. The creation status corresponding to the document index 002 in FIG. 7A is "incomplete". In this case, as shown in FIG. 8B, the left-view object image 12 is not stored in the FB113b, unlike the case of FIG. 6B. The creation status corresponding to the document index 003 in FIG. 7A is "complete". In this case, as shown in FIG. 8C, the left-view object image 13 is stored in the FB113c, as in the case of FIG. 6C.

Figure 8G:

FIGS. 8E through 8G schematically illustrate the right-view object images stored in the FB114a through FB114c when the right-view creation status table is as in FIG. 7B.

FB114a through FB114c correspond to document indices 001 through 003.

The creation status corresponding to the document index 001 in FIG. 7B is "complete". In this case, as shown in FIG. 8E, the right-view object image 21 is stored in the FB114a, as in the case of FIG. 6E. The creation status corresponding to the document index 002 in FIG. 7B is "incomplete". In this case, as shown in FIG. 8F, the right-view object image 22 is not stored in the FB114b, unlike the case of FIG. 6F. The creation status corresponding to the document index 003 in FIG. 7C is "incomplete". In this case, as shown in FIG. 8G, the right-view object image 23 is not stored in the FB114c, unlike the case of FIG. 6G.

Figure 8D:
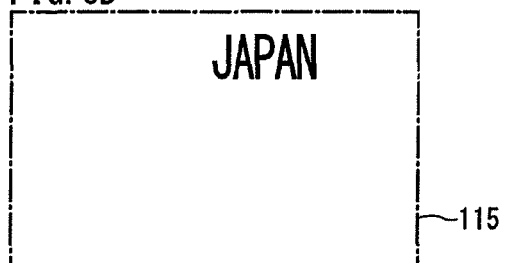
FIG. 8D schematically illustrates a left-view data broadcast image.
Figure 8H:
FIG. 8H schematically illustrates a right-view data broadcast image.

When the left-view creation status table and the right-view creation status table are as shown in FIGS. 7A and 7B, respectively, then since both creation statuses with a document index of 001 are "complete", the left/right-view data broadcast synchronization unit 110 causes the left-view display generation unit 115 to output the left-view object image stored in the corresponding FB113a and causes the right-view display generation unit 116 to output the right-view object image 21 stored in the FB114a. On the other hand, the images stored in the FB113b, the FB113c, the FB114b, and the FB114c are not output. Accordingly, the left-view data broadcast image generated by the left-view display generation unit 115 is as shown in FIG. 8D, and the right-view data broadcast image generated by the right-view display generation unit 116 is as shown in FIG. 8H. In other words, no inconsistency occurs between the left-view data broadcast image and the right-view data broadcast image.

2. Embodiment 2

In Embodiment 1, one left-view object image or right-view object image is generated from a character string described in the CDATA section and from the image files indicated in the img element tag of a BML document. It is then determined whether to position each left-view object image and each right-view object image respectively in a left-view data broadcast image and a right-view data broadcast image.

By contrast, in the present embodiment, the left-view object images and the right-view object images are not treated as units. Rather, the data broadcast display device manages images comprehensively by units of image generation, which are individual units for generating an image. The units of image generation are determined by the resources in the device, and by the libraries and algorithms used to generate the left-view object images and the right-view object images.

In the present embodiment, the following three types of units of image generation are used as examples.

(1) In a character string object that includes a line break, the portion up to the line break is handled as one unit of image generation. For example, if the CDATA section of a BML document lists a character string that includes a line break, such as "JAPAN<br>AVC", then the character strings "JAPAN" and "AVC" on either side of the line break are each a unit of image generation.

(2) A character string consisting of a sequence of alphanumeric characters and a character string consisting of a sequence of kana and kanji characters are each treated as a unit of image generation. For the sake of convenience, in the present description, a character string of kana/kanji characters is considered to include hiragana, katakana, and kanji characters. Also for the sake of convenience, a sequence of alphanumeric characters is considered to include alphanumeric characters, symbols, and non-standard characters other than hiragana, katakana, and kanji characters.

For example, if the CDATA section of the BML document lists "3D data broadcast", with the words "data broadcast" in Japanese, this character string is treated as two units of image generation: an alphanumeric character string "3D", and a kana/kanji character string "data broadcast" (in Japanese).

(3) A plurality of left-view object images or right-view object images with overlapping layout positions collectively form one units of image generation. For example, in the BML document, if a left-view object image representing a shaded circular graphic and a left-view object image representing the letter "A" are grouped as have overlapping positions, these object images are treated as one units of image generation for "an image representing the letter "A" overlaid on a shaded circular graphic".

Hereinafter, both a unit of image generation resulting from dividing a left-view object image and a unit of image generation in which a plurality of left-view object images are grouped together are referred to as a "single left-view object image". Furthermore, a left-view object image before division is referred to as a "unified left-view object image", and left-view object images before being grouped are referred to as "partial left-view object images".

Similarly, both a unit of image generation resulting from dividing a right-view object image and a unit of image generation in which a plurality of right-view object images are grouped together are referred to as a "single right-view object image". Furthermore, a right-view object image before division is referred to as a "unified right-view object image", and right-view object images before being grouped are referred to as "partial right-view object images".

Figure 11A:
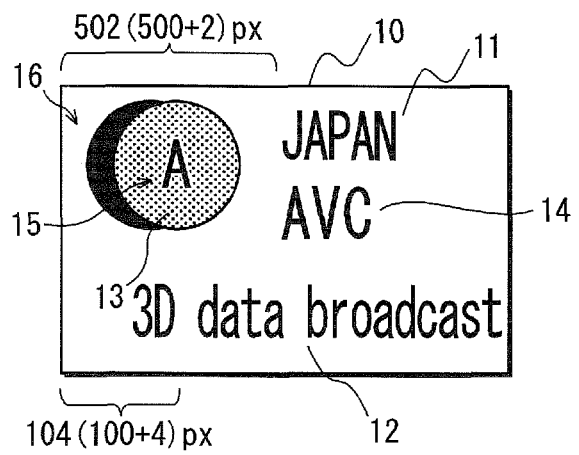
FIGS. 11A through 11C show an example of a data broadcast image that a data broadcast display device displays.
Figure 11B:
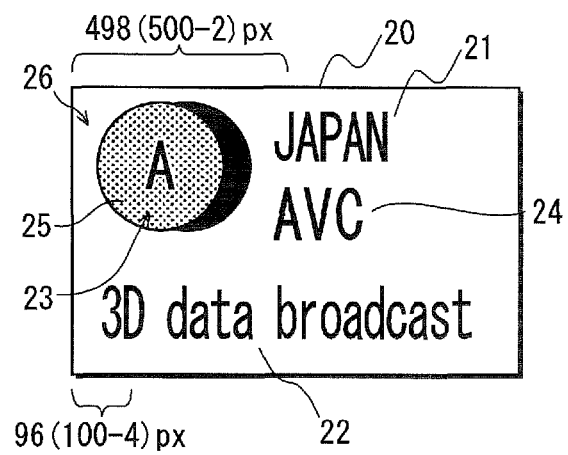
Figure 11C:
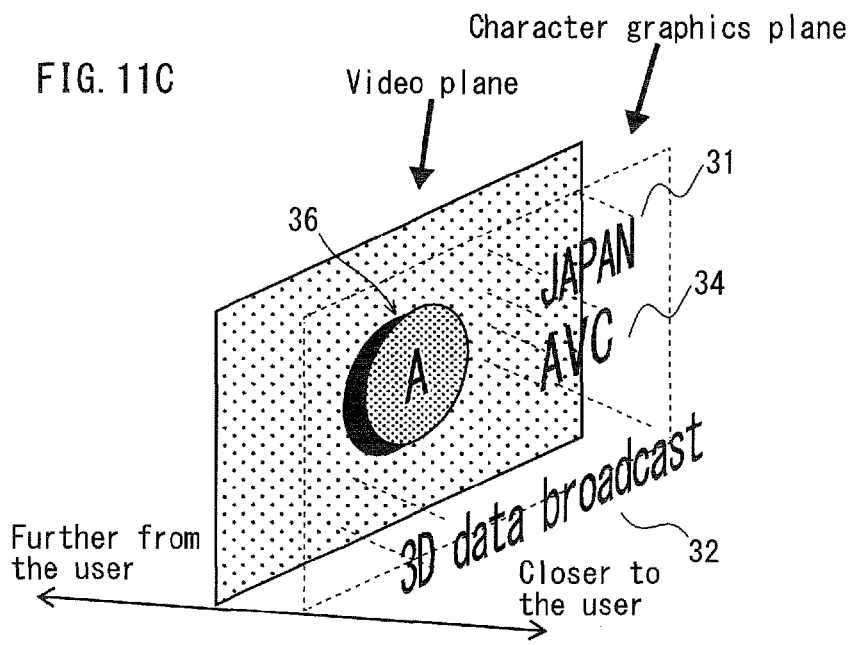
Figure 15A:
FIG. 15A through FIG. 15E schematically illustrate left-view object images recorded in a FB, and FIGS. 15F through 15J schematically illustrate right-view object images recorded in a FB.
Figure 15F:
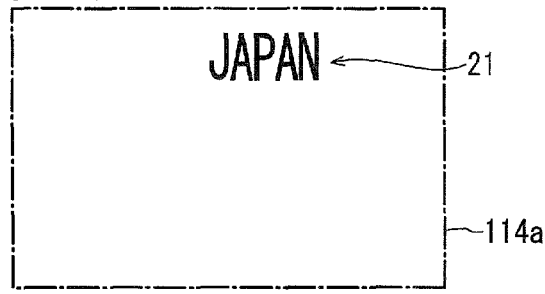
Figure 15B:
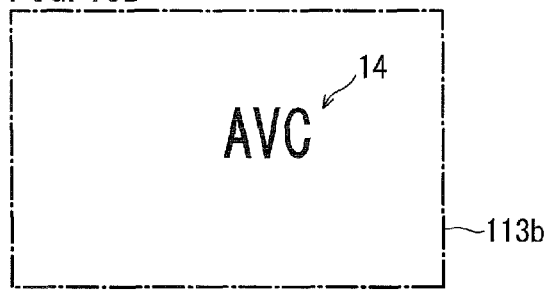
Figure 15G:
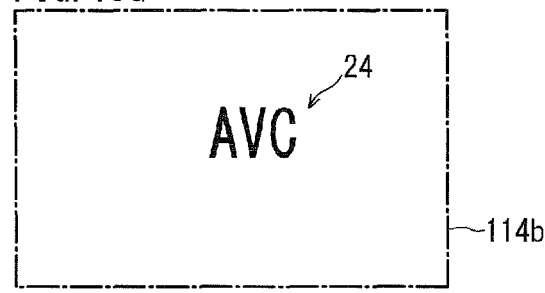
Figure 15C:
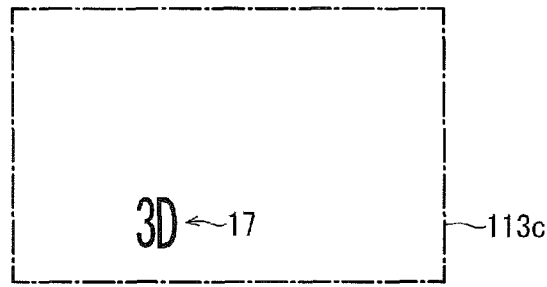
Figure 15H:
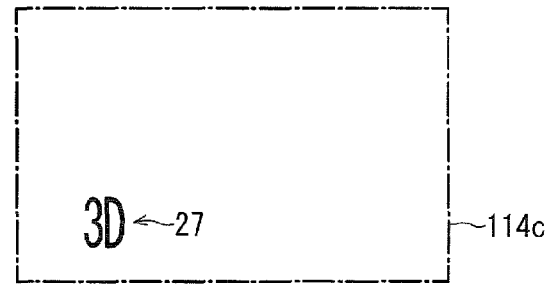
Figure 15D:
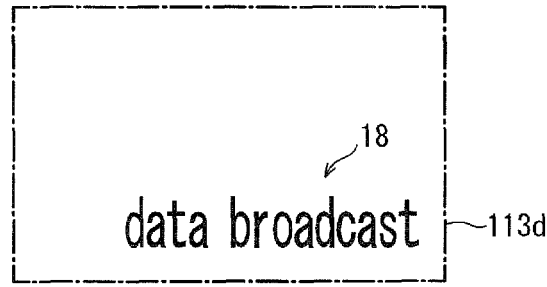
Figure 15I:
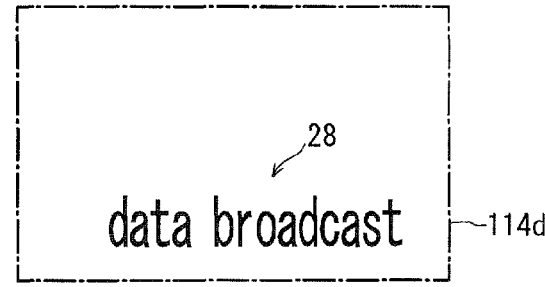
Figure 15E:
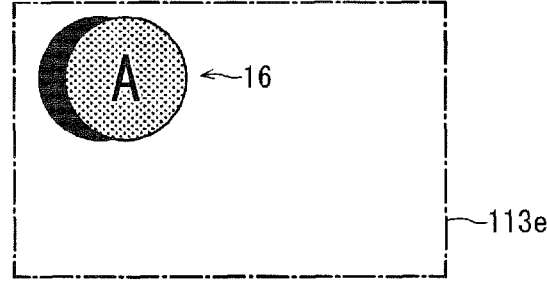
Figure 15J:
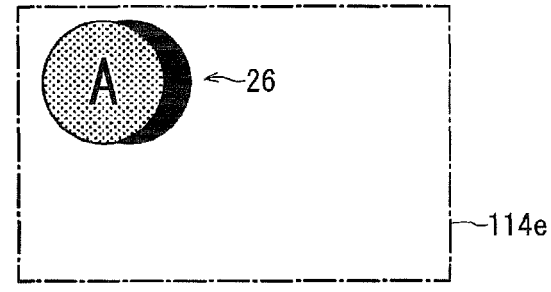

FIGS. 11A through 11C show an example of a data broadcast image that the data broadcast display device of the present embodiment is to display. FIG. 11A schematically illustrates a left-view data broadcast image 10 according to the present embodiment. The left-view data broadcast image 10 includes a left-view object image representing a two-tiered character string "JAPAN" "AVC", a left-view object image 12 representing a character string "3D data broadcast", a left-view object image 15 representing the letter "A", and a left-view object image 13 representing a shaded circular graphic. FIG. 11B schematically illustrates a right-view data broadcast image 20 according to the present embodiment. The right-view data broadcast image 20 includes a right-view object image representing a two-tiered character string "JAPAN" "AVC", a right-view object image 22 representing a character string "3D data broadcast", a right-view object image 25 representing the letter "A", and a right-view object image 23 representing a shaded circular graphic.

The data broadcast display device of the present embodiment displays the left-view data broadcast image and the right-view data broadcast image illustrated in FIG. 11 by ensuring conformity between single left-view object images and single right-view object images. The data broadcast display device thereby avoids displaying non-stereoscopic images, thus avoiding the problem of causing the user to experience eyestrain. The following describes the data broadcast display device of the present embodiment in detail. Note that an explanation is omitted for sections that do not differ from Embodiment 1.

2.1 Structure

A data broadcast display device 100 according to the present embodiment does not differ in terms of constituent elements from those shown in the block diagram of FIG. 2 for Embodiment 1.

BML Document

The following describes the BML document of the present embodiment. FIG. 12A is an extract of startup.bml, which is an example of a BML document, showing the portion pertaining to the present embodiment. While this startup.bml is not substantially modified from Embodiment 1, the following differences occur.

(1) The element tag 201 in Embodiment 1 is changed to an element tag 501. In the element tag 501, the CDATA section is "JAPAN<br>AVC", which includes a line break.

(2) An element tag 504 is added. In the element tag 504, the top and left entries are the same values as the top and left entries of the element tag 203. In other words, the left-view object image for the element tag 203 and the left-view object image for the element tag 504 are indicated as being in overlap.

Left-View Layout Information and Right-View Layout Information

Since the content of the acquired BML document is modified as described above, the left-view layout information and the right-view layout information that the layout acquisition unit 108 generates differs from Embodiment 1.

FIG. 13A illustrates left-view layout information 600 according to the present embodiment. FIG. 13B illustrates right-view layout information 610 according to the present embodiment. Specifically, the left-view layout information in FIG. 13A differs from the left-view layout information 300 of Embodiment 1 in that the value entry in the left-view layout information 601 with a document index of 001 is "JAPAN<br>AVC", and in that a piece of left-view layout information with a document index of 004 has been added. The right-view layout information in FIG. 13B differs in the same way as the left-view layout information.

Left-View Data Broadcast FB 113, Right-View Data Broadcast FB 114, Left-View Display Generation Unit 115, and Right-View Display Generation Unit 116

The processing by the left-view data broadcast FB 113, the right-view data broadcast FB 114, the left-view display generation unit 115, and the right-view display generation unit 116 that treated the left-view object image and the right-view object image as units in Embodiment 1 is modified to treat single left-view object images and single right-view object images as units.

Left-View Data Broadcast Creation Unit 111

The left-view data broadcast creation unit 111 differs from Embodiment 1 in the following three points. (1) The left-view data broadcast creation unit 111 acquires a single left-view layout information table from the left/right-view data broadcast synchronization unit 110 instead of left-view layout information. (2) Based on the single left-view layout information table, the left-view data broadcast creation unit 111 does not generate a left-view object image, but rather generates a single left-view object image and, upon completion of creation of the single left-view object image, provides the left/right-view data broadcast synchronization unit 110 with a completion notification that includes a synchronization unit index. (3) For one piece of single left-view layout information, the left-view data broadcast creation unit 111 reserves an amount of FB in the left-view data broadcast FB 113 for one left-view data broadcast image.

Note that the single left-view layout information and the synchronization unit index are described below. Furthermore, the right-view data broadcast creation unit 112 differs from Embodiment 1 in the same way as the left-view data broadcast creation unit 111, and therefore a description of the differences is omitted.

Left/Right-View Data Broadcast Synchronization Unit 110

Since the left/right-view data broadcast synchronization unit 110 differs greatly from Embodiment 1, the following description is divided into three sections: (a) generation of single left-view layout information and single right-view layout information, (b) creation of the left-view creation status table and the right-view creation status table, and (c) output control of single left-view object images and single right-view object images.

a. Generation of Single Left-View Layout Information and Single Right-View Layout Information The left/right-view data broadcast synchronization unit 110 acquires left-view layout information and right-view layout information from the layout acquisition unit 108, and based on the left-view layout information and the right-view layout information, generates single left-view layout information and single right-view layout information.

Whereas the left-view layout information indicates the layout in units of left-view object images, the single left-view layout information is a conversion of the left-view layout information to indicate the layout in units of single left-view object images. Similarly, whereas the right-view layout information indicates the layout in units of right-view object images, the single right-view layout information is a conversion of the right-view layout information to indicate the layout in units of single right-view object images.

FIG. 14A illustrates an example of a single left-view layout information table, which lists single left-view layout information.

The single left-view layout information is composed of the following entries: synchronization unit index, element name, document index, top, left, type, and value. The synchronization unit index is a serial number assigned to each piece of single left-view layout information in the single left-view layout information table. The element name, document index, top, left, type, and value have exactly the same content as the element name, document index, top, left, type, and value in the left-view layout information.

The following describes the process for generating the single left-view layout information table. The left/right-view data broadcast synchronization unit 110 converts the left-view layout information table into the single left-view layout information table through processes (1) through (4) below.

(1) The left/right-view data broadcast synchronization unit 110 determines whether each piece of left-view layout information satisfies condition 1: "the type is 'character string', and a br element (<br>) is included in the value". When condition 1 is satisfied, two pieces of single left-view layout information are generated based on the left-view layout information (referred to as single left-view layout information A and single left-view layout information B for the sake of convenience).

Specifically, the values of the element name, document index, left, and type of the pieces of single left-view layout information A and B are the same as the values of the left-view layout information. The value entry of the pieces of single left-view layout information A and B is listed by dividing up the value entry of the left-view layout information into a character string before the <br> (earlier character string) and a character string after the <br> (later character string). The earlier character string is listed in the value entry of the single left-view layout information A, and the later character string is listed in the value entry of the single left-view layout information B. The value listed in the top entry in the single left-view layout information A is the value of the top entry in the left-view layout information. The top entry in the single left-view layout information B is set to the value of the top entry in the left-view layout information, with the addition of a predetermined value (for example, 300 px). This predetermined value is set to represent a line break between the earlier character string and the later character string.

(2) The left/right-view data broadcast synchronization unit 110 determines whether each piece of left-view layout information satisfies condition 2: "the type is 'character string', and the value includes a combination of a character string of alphanumeric characters and the like and a character string of kana/kanji and the like". When condition 2 is satisfied, the left-view layout information is converted into two pieces of single left-view layout information (referred to as single left-view layout information C and single left-view layout information D for the sake of convenience). Specifically, the values of the element name, document index, top, and type of the pieces of single left-view layout information C and D are the same as the values of the left-view layout information. The value entry of the pieces of single left-view layout information C and D is listed by dividing up the value entry of the left-view layout information into an alphanumeric portion and a kana/kanji portion. The alphanumeric portion is listed in the value entry of the single left-view layout information C, and the kana/kanji portion is listed in the value entry of the single left-view layout information D.

The value listed in the left entry in the single left-view layout information C is the value of the left entry in the left-view layout information. The value listed in the left entry in the single left-view layout information D is the value of the left entry in the left-view layout information, to which is added the display length of a single object image representing the character string of the single left-view layout information C. The display length is for concatenated display of the single object image representing the kana/kanji of the single left-view layout information C and a single object image representing the alphanumeric characters of the single left-view layout information D.

The determination of whether a character string is an alphanumeric character string or a kana/kanji character string is, for example, made by referring to a character code table. If a character is included in the range defined by alphanumeric codes in the character code table, the character is determined to be an alphanumeric character, whereas if the character is included in the range defined by kana/kanji codes in the character code table, the character is determined to be kana/kanji.

(3) The left/right-view data broadcast synchronization unit 110 determines whether the pieces of left-view layout information satisfy condition 3: "the layout positions of a plurality of pieces of left-view layout information overlap". When condition 3 is satisfied, the left/right-view data broadcast synchronization unit 110 groups the plurality of pieces of left-view layout information with matching layout positions for conversion into one piece of single left-view layout information. Specifically, the element name, document index, top, left, type, and value entries in the single left-view layout information list the values of these entries in two pieces of left-view layout information. The synchronization unit index is assigned individually to one piece of single left-view layout information. The left/right-view data broadcast synchronization unit 110 determines whether layout positions overlap based on factors such as left, top, character string length, and character string display size. Processes (1) through (3) result in conversion of left-view object images and right-view object images into units of image generation.

(4) The left/right-view data broadcast synchronization unit 110 neither divides nor groups pieces of left-view layout information that do not satisfy conditions 1 through 3, instead generating pieces of single left-view layout information in one-to-one correspondence with pieces of left-view layout information. Specifically, the element name, document index, top, left, type, and value entries in the single left-view layout information list the values of these entries in the left-view layout information.

In the case of FIG. 14A, the single left-view layout information with a synchronization unit index of 001 has an element name of p, a document index of 001, a top entry of 100, a left entry of 502, a type of character string, and a value of JAPAN. The single left-view layout information with a synchronization unit index of 002 has an element name of p, a document index of 001, a top entry of 300, a left entry of 502, a type of character string, and a value of AVC. The pieces of single left-view layout information respectively having a synchronization unit index of 001 and 002 have the same document index of 001 and were generated by dividing one piece of left-view layout information having a document index of 001. The pieces of single left-view layout information respectively having a synchronization unit index of 003 and 004 have the same document index of 002 and were generated by dividing one piece of left-view layout information having a document index of 002. The single left-view layout information with a synchronization unit index of 005 was generated by grouping two pieces of left-view layout information: the left-view layout information with an element name of p and a document index of 004, and the left-view layout information with an element name of img and a document index of 003.

FIG. 14B illustrates an example of a single right-view layout information table. Since the method of generation and the content of the single right-view layout information table do not differ from that of the single left-view layout information table, a description thereof is omitted.

b. Creation of Left-View Creation Status Table and Right-View Creation Status Table After generating the single left-view layout information table and the single right-view layout information table, the left/right-view data broadcast synchronization unit 110 creates a left-view creation status table and a right-view creation status table listing whether creation of the single left-view object image and the single right-view object image represented by each piece of single left-view layout information and single right-view layout information is complete or incomplete. Then, after creating the left-view creation status table and the right-view creation status table, the left/right-view data broadcast synchronization unit 110 outputs the single left-view layout information table to the left-view data broadcast creation unit 111 and outputs the single right-view layout information table to the right-view data broadcast creation unit 112.

FIG. 16A illustrates a left-view creation status table 720.

The left-view creation status table 720 differs from the left-view creation status table 320 of Embodiment 1 in FIG. 7A in that the document index is replaced by the synchronization unit index. The synchronization unit index matches the synchronization unit index of the single left-view layout information. Therefore, the creation status in each line of the left-view creation status table corresponds to the piece of single left-view layout information with the same synchronization unit index as the synchronization unit index in the line of the creation status. The initial value of the creation status in the left-view creation status table is "incomplete".

Upon receiving a completion notification from the left-view data broadcast creation unit 111, the left/right-view data broadcast synchronization unit 110 sets the creation status identified by the synchronization unit index included in the completion notification to "complete" in the left-view creation status table.

FIG. 7B illustrates an example of a right-view creation status table. The description of the right-view creation status table is similar to that of the left-view creation status table and is therefore omitted.

c. Controlling Output of Single Left-View Object Images and Single Right-View Object Images The left/right-view data broadcast synchronization unit 110 performs control to cause the left-view display generation unit 115 to output the single left-view object image stored in the left-view data broadcast FB 113 and cause the right-view display generation unit 116 to output the single right-view object image stored in the right-view data broadcast FB 114 at predetermined intervals (for example, at intervals synchronized with the refresh interval of the display 118). Specifically, during this control the left/right-view data broadcast synchronization unit 110 searches the left-view creation status table and the right-view creation status table for creation statuses that correspond to the same synchronization unit index value and that are both "complete". When both creation statuses are "complete", the left/right-view data broadcast synchronization unit 110 causes the left-view display generation unit 115 to output the single left-view object image that corresponds to the synchronization unit index and is stored in the left-view data broadcast FB 113. The left/right-view data broadcast synchronization unit 110 also causes the right-view display generation unit 116 to output the single right-view object image that corresponds to the synchronization unit index and is stored in the right-view data broadcast FB 114.

If at least one of the creation statuses corresponding to the same synchronization unit index value in the left-view creation status table and the right-view creation status table is not "complete", the left/right-view data broadcast synchronization unit 110 neither causes the left-view display generation unit 115 to output the single left-view object image corresponding to the synchronization unit index nor causes the right-view display generation unit 116 to output the single right-view object image corresponding to the synchronization unit index.

FIGS. 17A through 17E schematically illustrate the single left-view object images stored in the FB113a through FB113e when the left-view creation status table is as in FIG. 16A.

FB113a through FB113e correspond to synchronization unit indices 001 through 005.

Figure 17A:
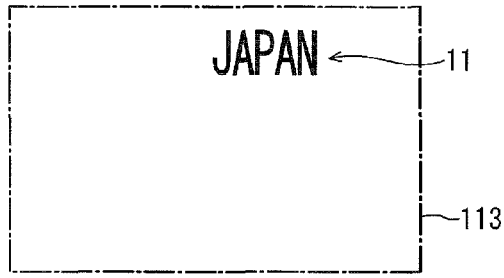
FIG. 17A through FIG. 17E schematically illustrate left-view object images recorded in a FB, and FIGS. 17F through 17J schematically illustrate right-view object images recorded in a FB.

The creation status corresponding to the synchronization unit index 001 in FIG. 16A is "complete". In this case, as shown in FIG. 17A, the single left-view object image 11 is stored in the FB113a at the position represented by the top and left entries.

Figure 17F:
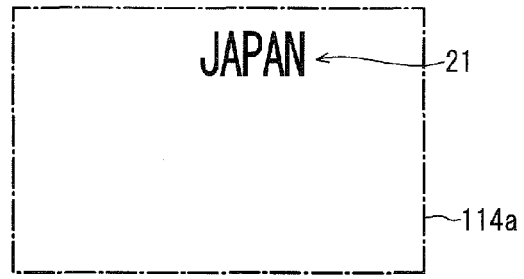
Figure 17B:
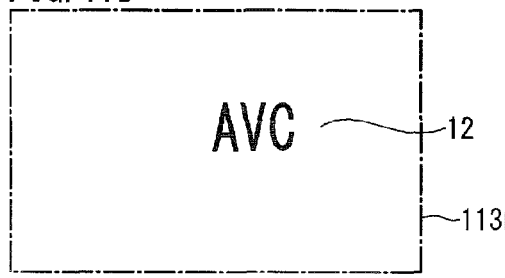

The creation status corresponding to the synchronization unit index 002 in FIG. 16A is "complete". In this case, as shown in FIG. 17B, the single left-view object image 12 is stored in the FB113b at the position represented by the top and left entries.

Figure 17G:
Figure 17C:
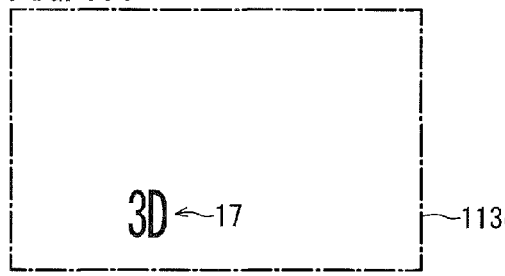
Figure 7H:
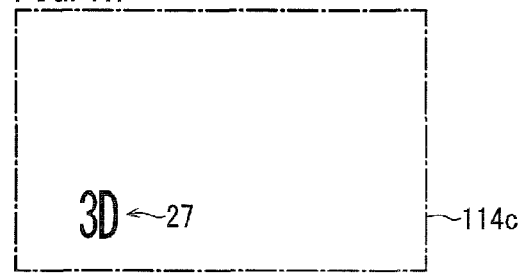

The creation status corresponding to the synchronization unit index 003 in FIG. 16A is "complete". In this case, as shown in FIG. 17C, the single left-view object image 17 is stored in the FB113c at the position represented by the top and left entries.

Figure 17D:

On the other hand, the creation status corresponding to the synchronization unit index 004 in FIG. 16A is "incomplete". In this case, as shown in FIG. 17D, no single left-view object image is stored in the FB113d.

Figure 17I:
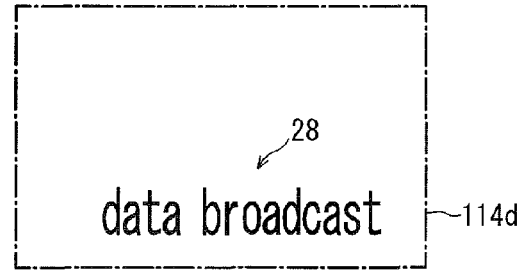
Figure 17E:
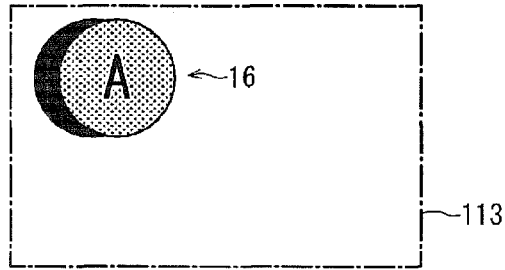

Finally, the creation status corresponding to the synchronization unit index 005 in FIG. 16A is "complete". In this case, as shown in FIG. 17E, the single left-view object image 16 is stored in the FB113e.

FIGS. 17F through 17J schematically illustrate the single right-view object images stored in the FB114a through FB114e when the right-view creation status table is as in FIG. 16B. FB114a through FB 114e correspond to synchronization unit indices 001 through 005.

The creation status corresponding to the synchronization unit index 001 in FIG. 16B is "complete". In this case, as shown in FIG. 17F, the single right-view object image 21 is stored in the FB114a at the position represented by the top and left entries.

The creation status corresponding to the synchronization unit index 002 in FIG. 16B is "incomplete". In this case, as shown in FIG. 17G, no single right-view object image is stored in the FB114b.

The creation status corresponding to the synchronization unit index 003 in FIG. 16B is "complete". In this case, as shown in FIG. 17H, the single right-view object image 27 is stored in the FB114c at the position represented by the top and left entries.

The creation status corresponding to the synchronization unit index 004 in FIG. 16B is also "complete". In this case, as shown in FIG. 17I, the single right-view object image 28 is stored in the FB113d.

Figure 17J:

On the other hand, the creation status corresponding to the synchronization unit index 005 in FIG. 16B is "incomplete". In this case, as shown in FIG. 17J, no single right-view object image is stored in the FB114e.

When the left-view creation status table and the right-view creation status table are respectively as shown in FIG. 16A and FIG. 16B, then since both creation statuses with a synchronization unit index of 001 are "complete", the left/right-view data broadcast synchronization unit 110 causes the left-view display generation unit 115 to output the single left-view object image 11 stored in the corresponding FB113a and causes the right-view display generation unit 116 to output the single right-view object image 21 stored in the FB114a.

Since both creation statuses with a synchronization unit index of 003 are "complete", the left/right-view data broadcast synchronization unit 110 also causes the left-view display generation unit 115 to output the single left-view object image 17 stored in the corresponding FB113c and causes the right-view display generation unit 116 to output the single right-view object image 27 stored in the FB114c.

On the other hand, at least one of the creation statuses in each set of creation statuses with a synchronization unit index of 002, 004, and 005 is "incomplete". Therefore, the left/right-view data broadcast synchronization unit 110 causes the corresponding single left-view object images 12, 14, and 16 and the corresponding single right-view object images 22, 24, and 26 not to be output.

Figure 18A:
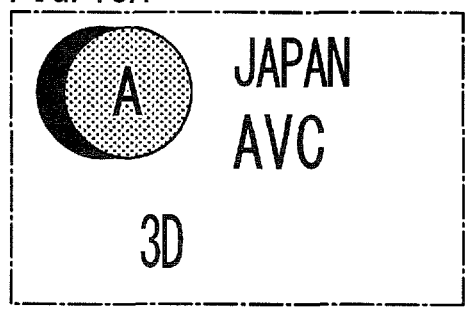
FIG. 18A schematically illustrates a left-view data broadcast image.
Figure 18B:
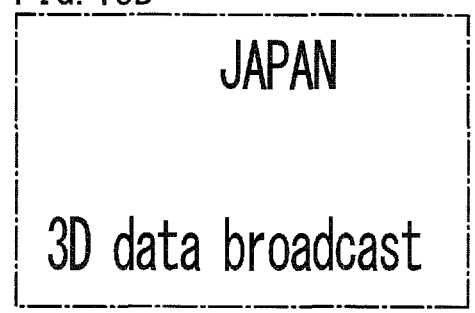
FIG. 18B schematically illustrates a right-view data broadcast image.
Figure 18C:
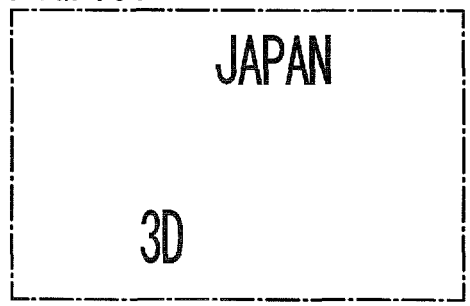
FIG. 18C schematically illustrates a left-view data broadcast image.
Figure 18D:
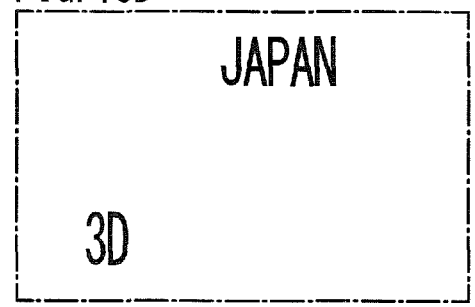
FIG. 18D schematically illustrates a right-view data broadcast image.

As a result of this control, the left-view data broadcast image created by the left-view display generation unit 115 is as shown in FIG. 18C, and the right-view data broadcast image created by the right-view display generation unit 116 is as shown in FIG. 18D. In other words, no inconsistency occurs between the left-view data broadcast image and the right-view data broadcast image.

Note that if the images shown in FIGS. 17A through 17E were output to the left-view display generation unit 115, the left-view display generation unit 115 would overlay these images to generate a left-view data broadcast image as shown in FIG. 18A. Similarly, if the images shown in FIGS. 17F through 17J were output to the right-view display generation unit 116, the right-view display generation unit 116 would overlay these images to generate a right-view data broadcast image as shown in FIG. 18B. In this case, the left-view data broadcast image and the right-view data broadcast image would be inconsistent.

2.2 Operations

The following describes processing for output of the left/right-view data broadcast images by the data broadcast display device 100 of the present embodiment.

Figure 19:
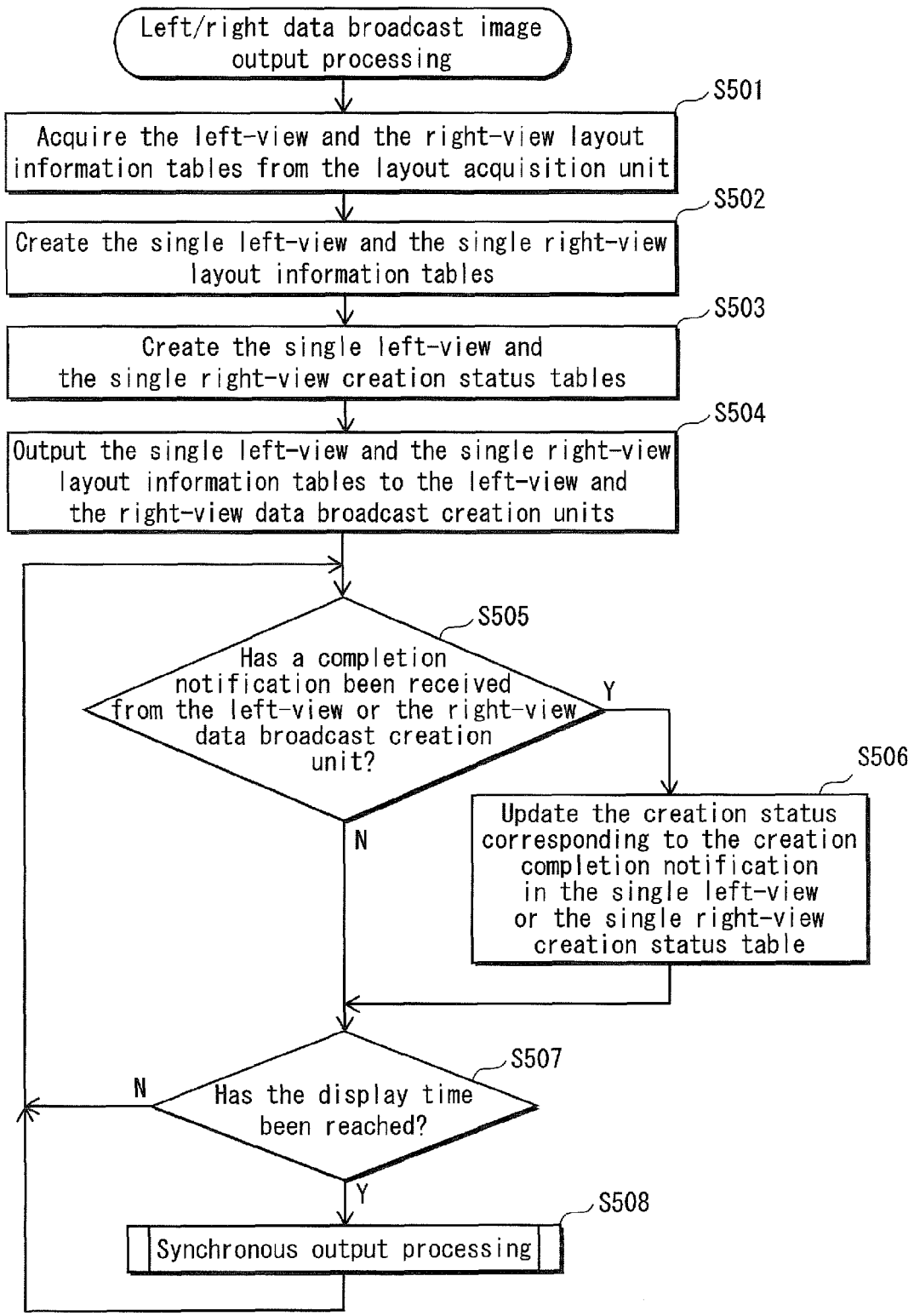
FIG. 19 is a flowchart showing processing to output left/right-view data broadcast images.

FIG. 19 is a flowchart showing processing to output left/right-view data broadcast images.

First, the left/right-view data broadcast synchronization unit 110 acquires the left-view layout information table and the right-view layout information table from the layout acquisition unit 108 (S501). Based on the left-view layout information table and the right-view layout information, the left/right-view data broadcast synchronization unit 110 creates the left-view creation status table and the right-view creation status table (S502). Next, the left/right-view data broadcast synchronization unit 110 converts the left-view layout information into single left-view layout information and converts the right-view layout information into single right-view layout information (S503). The left/right-view data broadcast synchronization unit 110 then outputs the single left-view layout information table to the left-view data broadcast creation unit 111 and the single right-view layout information table to the right-view data broadcast creation unit 112 (S504).

Next, the left/right-view data broadcast synchronization unit 110 waits for a completion notification for the single left-view object image and for the single right-view object image from the left-view data broadcast creation unit 111 and the right-view data broadcast creation unit 112 (S505). Upon receiving a completion notification from the left-view data broadcast creation unit 111 (S505: Y), the left/right-view data broadcast synchronization unit 110 sets the creation status identified by the synchronization unit index included in the completion notification to "complete" in the left-view creation status table. Similarly, upon receiving a completion notification from the right-view data broadcast creation unit 112, the left/right-view data broadcast synchronization unit 110 sets the creation status identified by the synchronization unit index included in the completion notification to "complete" in the right-view creation status table (S506). Processing then proceeds to step S507.

Next, the left/right-view data broadcast synchronization unit 110 determines whether a predetermined display time has been reached (S507). If the predetermined display time has not been reached, processing proceeds to S505. Otherwise, synchronous output is performed (S508), and processing then proceeds to S505.

Figure 20:
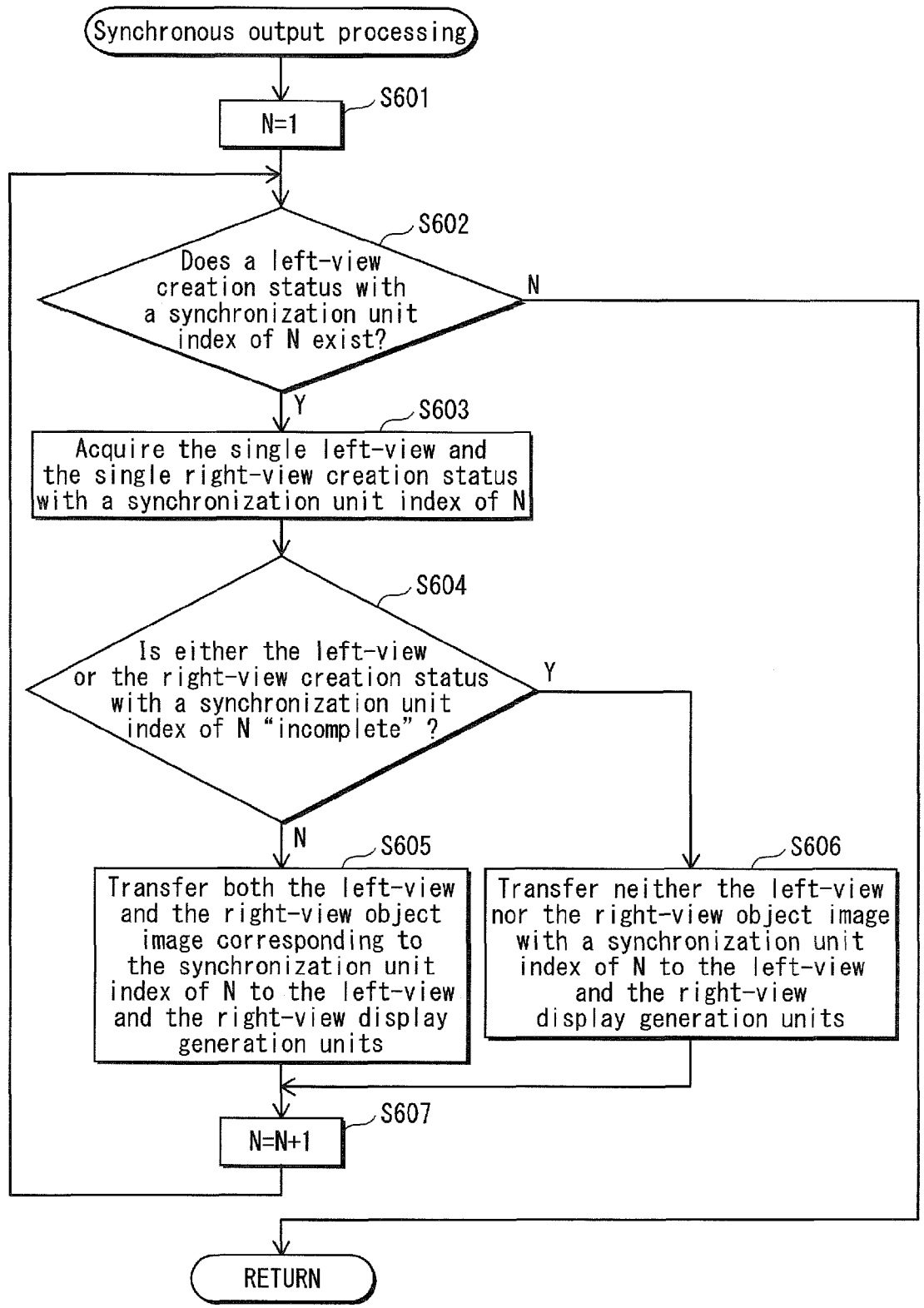
FIG. 20 is a flowchart showing processing for synchronous output.

FIG. 20 shows details on the synchronous output processing of S508. During the synchronous output processing, the left/right-view data broadcast synchronization unit 110 first assigns a variable N a value of 1 (S601). The variable N indicates the target synchronization unit index. Next, the left/right-view data broadcast synchronization unit 110 determines whether a left-view creation status and a right-view creation status whose synchronization unit index matches N exist in the left-view creation status table and the right-view creation status table (S602). If the creation statuses exist (S602: Y), the left/right-view data broadcast synchronization unit 110 reads the creation statuses whose synchronization unit index matches N from the left-view creation status table and the right-view creation status table (S603).

The left/right-view data broadcast synchronization unit 110 then determines whether either of the read creation statuses is "incomplete" (S604). If either is "incomplete" (S604: Y), then the left/right-view data broadcast synchronization unit 110 causes the left-view display generation unit 115 and the right-view display generation unit 116 not to output either of the left-view object image or the right-view object image corresponding to the synchronization unit index (S606). On the other hand, if neither of the creation statuses is "incomplete", i.e. if both are "complete" (S604: N), then the left/right-view data broadcast synchronization unit 110 causes both the left-view display generation unit 115 and the right-view display generation unit 116 respectively to output the single left-view object image and the single right-view object image corresponding to the synchronization unit index (S605). The left/right-view data broadcast synchronization unit 110 then increments N by one (S607) and proceeds to S602. The left/right-view data broadcast synchronization unit 110 repeats the above steps until no left-view creation status or right-view creation status whose synchronization unit index matches N remains in the left-view creation status table and the right-view creation status table.

3. Embodiment 3

In Embodiments 1 and 2, one BML document lists information for generating the left-view object image and the right-view object image. The present embodiment differs from Embodiments 1 and 2 by dividing the BML document into a BML document listing information for generating the left-view object image (startup_L.bml) and a BML document listing information for generating the right-view object image (startup_R.bml).

Dividing the BML document into startup_L.bml and startup_R.bml eliminates the need for adding an offset attribute to the element tag and for adding a left_src attribute and a right_src attribute to the img element, as in startup.bml of Embodiment 2.

Figure 22:
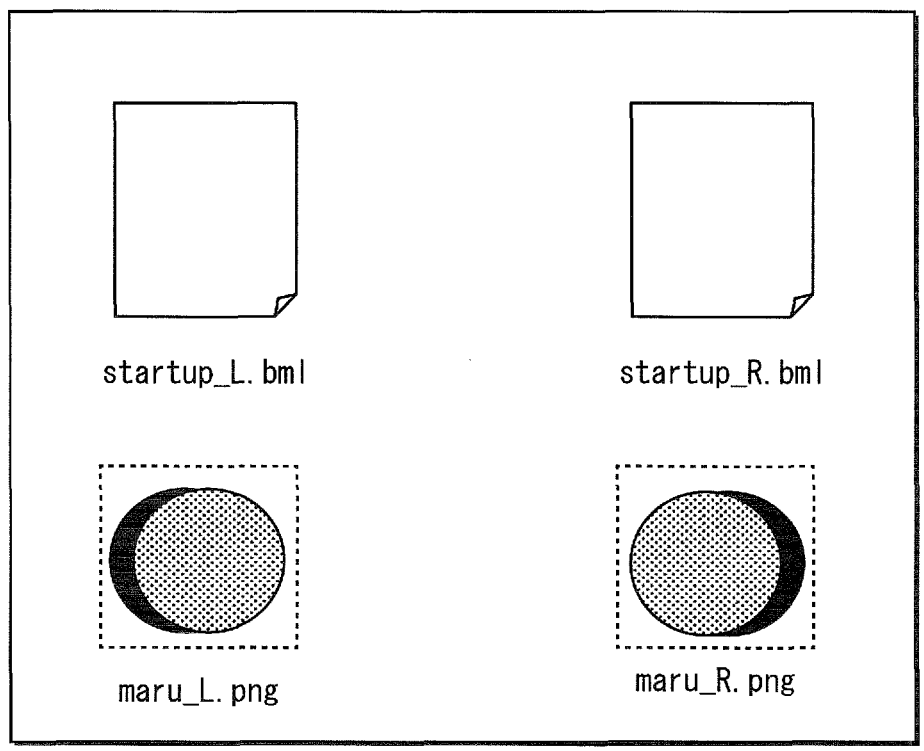
FIG. 22 illustrates an example of resources necessary to create data broadcast images.

Resources necessary for generating the left-view data broadcast image and the right-view data broadcast image in the present embodiment are startup_L.bml, startup_R.bml, maru_L.png, and maru_R.png, as shown in FIG. 22.

FIG. 23A is an extract of startup_L.bml, showing the portion pertaining to the present embodiment. FIG. 23B is an extract of startup_R.bml, showing the portion pertaining to the present embodiment.

Unlike startup.bml in the above embodiment, startup_L.bml and startup_R.bml are not extended by adding an offset attribute to the element tag, nor by adding the left_src attribute and the right_src attribute to the img element. However, in order to identify the element tags that represent the same object, corresponding element tags are listed in the same order in startup_L.bml and in startup_R.bml.

For example, the p element 1201, which is the first element tag in the <body> element of startup_L.bml 1200, and the p element 1211, which is the first element tag in the <body> element of startup_R.bml 1210, are elements representing the same object.

In startup.bml of Embodiments 1 and 2, it is necessary to represent layout information for both the left-view object image and the right-view object image in one p element. Therefore, an offset attribute value is added to the left attribute value in order to generate the left entry of the left-view layout information, and the offset attribute value is subtracted from the left attribute value in order to generate the left entry of the right-view layout information. In the present embodiment, on the other hand, it suffices to list the left attribute value of the p element in startup_L.bml as the left entry of the left-view layout information, and to list the left attribute value of the p element in startup_R.bml as the left entry of the right-view layout information. The need for processing to add or subtract the offset attribute value to or from the left attribute value is thus eliminated. The left attribute value of the p element in startup_L.bml lists a value resulting from adding the offset attribute value to the left attribute value of Embodiments 1 and 2. The left attribute value of the p element in startup_R.bml lists a value resulting from subtracting the offset attribute value from the left attribute value of Embodiments 1 and 2. In the example shown in FIGS. 23A and 23B, the left attribute value of the p element 1201 is set to 502, which is equal to the left attribute value of 500 plus the offset attribute value of two in Embodiment 1. On the other hand, the left attribute value of the p element 1211 is set to 498, which is equal to the left attribute value of 500 minus the offset attribute value of two in Embodiment 1.

Figure 21:
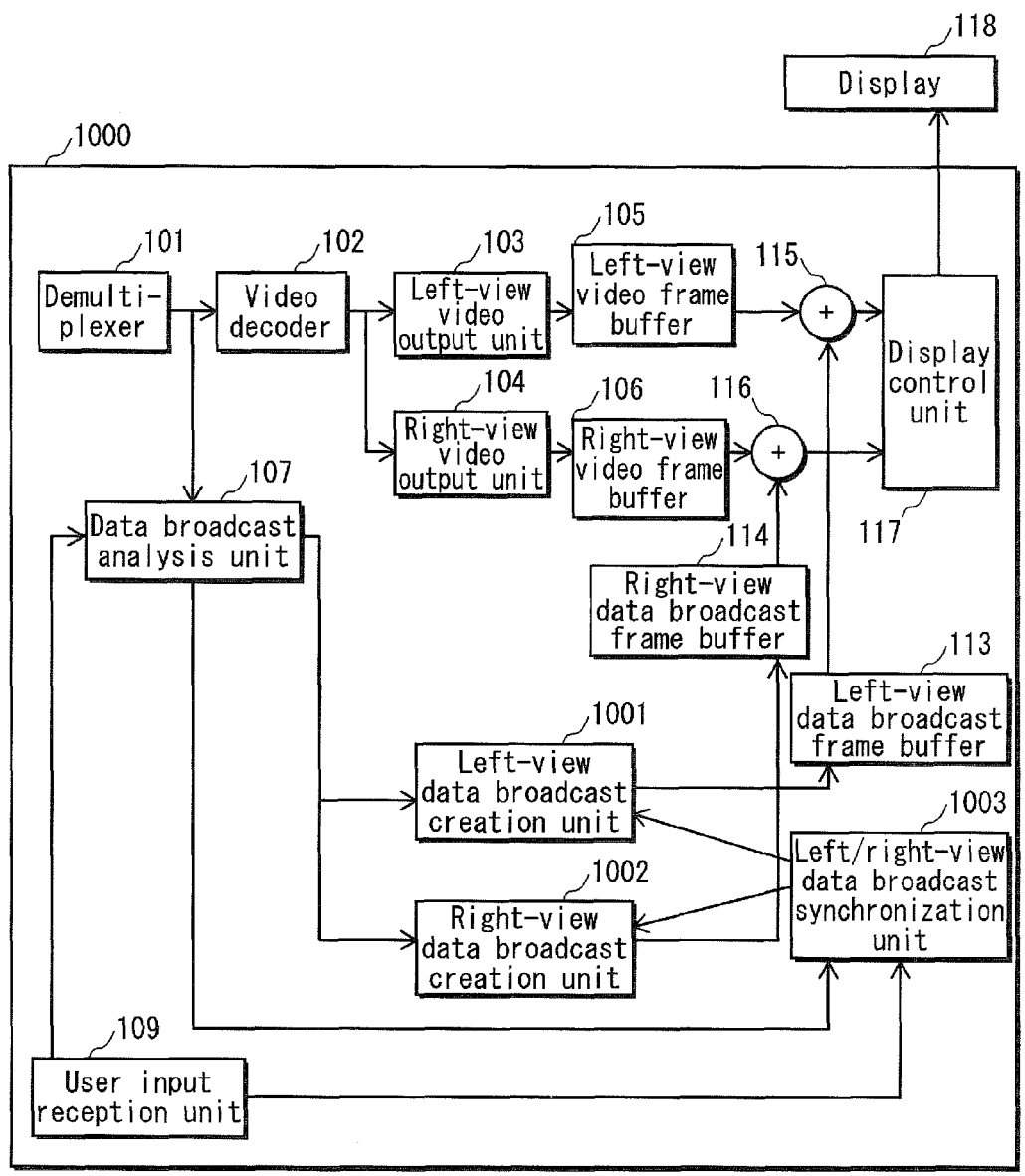
FIG. 21 is a block diagram illustrating the structure of a data broadcast display device according to Embodiment 3.

FIG. 21 is a block diagram illustrating the structure of a data broadcast display device 1000 according to Embodiment 3. FIG. 21 and FIG. 2 differ in the following respects. (1) The data broadcast analysis unit 107 extracts startup_L.bml and startup_R.bml from the data broadcast packets and outputs these documents to a left/right-view data broadcast synchronization unit 1103. (2) The layout acquisition unit 108 is removed. Instead of the layout acquisition unit 108, the left/right-view data broadcast synchronization unit 1103 acquires startup_L.bml and startup_R.bml from the data broadcast analysis unit 107 and generates the left-view layout information and the right-view layout information. Processing after the left/right-view data broadcast synchronization unit 1103 acquires the left-view layout information and the right-view layout information does not particularly differ from Embodiments 1 and 2.

4. Modifications

Embodiments of the data broadcast display device according to the present invention have been described, but the present invention is in no way limited to the data broadcast display device exactly as shown in the above embodiments. The example data broadcast display devices may be modified as follows.

(1) In Embodiment 1, the BML document is distributed after being multiplexed in the transport stream. The BML document may, however, be acquired in other ways. For example, the BML document may be acquired via communication over a network or the like.

Figure 4B:
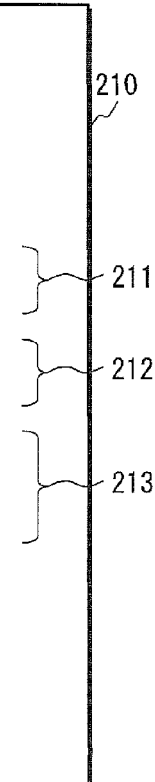

(2) In Embodiment 1, the BML document illustrated in FIG. 4A is acquired as the BML document, but it suffices to acquire equivalent information. For example, the offset attribute need not be listed in the style attribute as in FIG. 4A. Instead, the offset attribute may be separate from the style attribute, as in the BML document illustrated in FIG. 4B.

(3) In Embodiment 1, the predetermined timing of writing of the left-view video and the right-view video to the left-view video FB 105 and the right-view video FB 106 by the left-view video output unit 103 and the right-view video output unit 104 is synchronized with the refresh rate of the liquid crystal display, occurring a predetermined time before each refresh time. It simply suffices, however, to set the timing of writing such that the display 118 can properly display video.

(4) In Embodiment 1, each object is uniquely identified with an id attribute value. A different method of identification may be used, however, as long as objects are uniquely identifiable. For example, objects may be uniquely identified by the "element name" and the "document index" in the right-view layout information and the left-view layout information, without using an id attribute attached to each element in the BML document. With this approach, objects may be identified without attachment of an id attribute to each element of the BML document.

(5) In Embodiments 1 and 2, the type entry in the left-view layout information table and the right-view layout information table is either a character string or a still image. The type is not limited in this way, however, and includes anything representable as an object in a 3D data broadcast image. For example, if maps, symbols, moving video, or the like are used as objects, the types map, symbol, moving video, and the like may be included.

(6) In Embodiment 2, three types of units of image generation are described, but units of image generation are not limited in this way. Any unit for generation of an image is acceptable. For example, in the case of character string data, units of image generation may be character strings composed of one character, of two or more characters, or the like. In the case of still image data, units of image generation may be a still image divided into two parts, divided into N parts (N being a natural number three or greater), or the like.

In Embodiment 2, a character string in the CDATA section is divided before and after a line break, and each of the character strings resulting from the division is a unit of image generation. The control information for dividing character strings is not, however, limited to a line break and may be any information for dividing character strings. For example, a character string may be divided up by spaces, by tabs, or the like, with each resulting character string being a unit of image generation.

When there is no control information, the character string may be divided when the character string is displayed over a plurality of lines due to the width of the text box in which the character string is displayed. Each resulting character string would be a unit of image generation.

In Embodiment 2, character strings are divided into two types, "alphanumeric" and "kana/kanji". The method of division is not limited in this way, however, and any method that divides character strings into certain units may be used. For example, a character string may be divided into character strings of different sizes, character strings of differing colors, or character strings of differing fonts, with each resulting character string being a unit of image generation.

Furthermore, in Embodiment 2, character strings are classified into two types, "alphanumeric" and "kana/kanji". Instead, the classifications in the character set described in B-24 of ARIB may be used. Specifically, each of the following may be divided into a different character type: "kanji", "alphanumeric", "hiragana", "katakana", "mosaic A", "mosaic B", "mosaic C", "mosaic D", "proportional alphanumeric", "proportional hiragana", "proportional katakana", "JIS X0201 katakana", "JIS compatible kanji plane 1", "JIS compatible kanji plane 2", "additional symbols", and "DRCS".

In Embodiment 2, an example of dividing the character string in the CDATA section into two character strings is described, but the character string may be divided into three or more character strings.

Furthermore, in Embodiment 2, two left-view (right-view) object images are grouped to generate a single left-view (right-view) object image, yet the number is not limited to two. Three or more object images may be grouped together.

The user may be allowed to set the unit of image generation which the data broadcast display device is to use.

(7) In the present embodiment, the two left-view object images composing a single left-view object image are an object image for a character string and an object image for a graphic. Combinations of different types of object images are possible, however, as long as a single left-view object image is composed of a plurality of object images. When overlaying these object images, the character string object is overlaid on the graphic object in Embodiment 2. Any method, however, for constructing one single left-view object from a plurality of left-view objects is acceptable. For example, if the plurality of left-view objects constituting a single left-view object are all still object images, the object images may be overlaid starting with the object image with the largest image size on the bottom. Furthermore, if the plurality of left-view objects constituting a single left-view object are all still object images, the object images may be overlaid so that object images with a small document index are towards the bottom, and object images with a large document index are towards the top. In this case, when the BML document is generated at the transmitting end, it is necessary to stipulate the document indices of the plurality of left-view objects while taking into consideration how object images with a small document index are towards the bottom and object images with a large document index are towards the top when overlaid. The same stipulation is necessary for the right-view objects as well.

In the present embodiment, the display area of a character string is displayed on top of the display area of a static image with a large image size. When the display areas for a plurality of left-view objects overlap even slightly, the plurality of left-view objects may be treated as a single left-view object.

(8) In the above embodiments, an FB region for one data broadcast image is reserved in the left-view data broadcast FB 113 and in the right-view data broadcast FB 114 for each object image or each single object image. It suffices, however, to reserve a region for recording each object image or each single object image. For example, a region of the left-view data broadcast FB 113 and of the right-view data broadcast FB 114 having the same size as each object image or each single object image may be reserved as the FB region. In this case, the left-view display generation unit 115 and the right-view display generation unit 116 that generate data broadcast images would need to provide notification of the layout position of each object image or each single object image within the data broadcast images.

(9) In Embodiment 3, in order to associate elements in startup_L.bml 1200 and startup_R.bml 1210 that represent the same object, corresponding elements are listed in the same order. It suffices, however, for elements that represent the same object to be associated. For example, an id attribute may be provided to each element, and elements that represent the same object may be provided with the same id attribute value in startup_L.bml 1200 and startup_R.bml 1210.

In the case of FIGS. 23A and 23B, the id attribute of the p element 1201 in startup_L.bml 1200 and the id attribute of the p element 1211 in startup_R.bml 1210 may be set to the same attribute value of "id01" in order to indicate that the p element 1201 and the p element 1211 represent the same object.

(10) In Embodiment 1, when the type entry in the left-view layout information is a character string, the left-view data broadcast creation unit 111 performs predetermined processing, such as applying shading to the character string listed in the value entry to generate the left-view object image by conversion to a bitmap. The predetermined processing may, however, be any processing to generate a left-view object image from the received BML document, resources, and the like. For example, each character string may be associated in advance with a bitmap image, and the character string listed in the value entry may then be converted into the associated bitmap image in order to generate the left-view object image. The same holds for the right-view object image.

The same also holds for the single left-view object image and the single right-view object image in Embodiment 2.

(11) In Embodiment 3, the correspondence with the left-view BML document and the right-view BML document is indicated by appending "_L" to the end of the filename for the left-view BML document and "_R" to the end of the filename for the right-view BML document, e.g. startup_L.bml and startup_R.bml. As long as the correspondence is clear, however, other methods may be used.

(A) For example, the ARIB standard may be extended so that when a different BML document is launched from one BML document, both a left-view BML document and a right-view BML document are specified.

The left-view BML document 1400 in FIG. 24A illustrates a BML document that is based on an extended ARIB standard that allows for listing of the URLs of two BML documents to launch. In this case, a new function is defined, such as the function 1401, "browser.launch3dDocument", for which the first parameter indicates the left-view BML document, and the second parameter indicates the right-view BML document.

(B) As another example, the ARIB standard may be extended, so that either or both of the left-view BML document and the right-view BML document can list the URL or the like of the corresponding BML document.

The left-view BML document 1410 in FIG. 24B illustrates an example of a BML document that is based on an extended ARIB standard that allows for listing of the URL of a corresponding BML document.

In the extended 3*d* element (1411), the view attribute lists whether the BML document is a left-view or a right-view BML document, and the link_bml attribute lists the URL of the corresponding BML document. Specifically, in the 3d element 1411, the value of the view attribute is "left". Therefore, the BML document is a left-view BML document, and the value listed in the link_bml, "/40/0000/aaa02.bml", indicates the URL of the corresponding right-view BML document.

In this case, acquiring either the left-view or the right-view BML document provides knowledge of the URL of the corresponding BML document. This eliminates the need for adding a parameter to the function "browser.launchDocument" or the like that launches another BML document. In other words, only the URL of one of the two BML documents to be launched (for example, the left-view BML document) need be listed in the function 1412. Furthermore, after accessing the URL specified in the function 1412, "/40/0000/bbb01.bml", and acquiring bbb01.bml, the 3d element listed in bbb01.bml may be referred to in order to acquire the other corresponding BML document. As with the function 1401, the function 1412 may also be extended to allow for listing of the URLs of two BML documents to be launched.

(12) A control program may be recorded on a recording medium or distributed via communications channels or the like, the control program being composed of program code, in machine language or in a high-level language, for causing a processor in the data broadcast display device 100 and circuits connected to the processor to execute the processing for output of left/right-view data broadcast images, processing for synchronized output, and the like illustrated in the above embodiments. Such a recording medium may be an IC card, a hard disk, an optical disc, a flexible disk, ROM, a flash memory, or the like. The control program thus distributed is used by being stored in a memory or the like that can be read by the processor. The processor then executes the control program in order to achieve the functions described in the embodiments. Note that in addition to directly executing the control program, the processor may first compile the control program, or may execute the control program with an interpreter.

(13) The functional elements described in the above embodiments (the demultiplexer 101, the video decoder 102, the left-view video output unit 103, the right-view video output unit 104, the data broadcast analysis unit 107, the layout acquisition unit 108, the user input reception unit 109, the left/right-view data broadcast synchronization unit 110, the left-view data broadcast creation unit 111, the right-view data broadcast creation unit 112, the left-view display generation unit 115, the right-view display generation unit 116, the display control unit 117, and the like) may be implemented as circuits executing the functions, or may be implemented by one or a plurality of processors executing a program. Note that the above functional elements are typically achieved as an LSI, which is an integrated circuit. These functional elements may respectively be made into discrete chips, or part or all of may be made into one chip. Although referred to here as an LSI, depending on the degree of integration, the terms IC, system LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(14) Portions of the above embodiments and modifications may be combined with one another.

5. Supplementary Explanation

The following describes the structure of a data broadcast display device as another embodiment of the present invention, as well as modifications thereto and advantageous effects thereof.

(a) A data broadcast display device according to an embodiment of the present invention is for displaying a data broadcast image including a plurality of 3D objects each represented by a pair of a left-view object and a right-view object, comprising: a reception unit configured to receive object data for generating the left-view object and the right-view object; a display data generation unit configured to generate the left-view object and the right-view object for each of the plurality of 3D objects using the object data while providing notification upon completion of the generation of each left-view object and each right-view object; and a display control unit configured to determine, at predetermined time intervals, whether the notification has been received for both the left-view object and the right-view object for each of the plurality of 3D objects, to include both the left-view object and the right-view object in a data broadcast image for display when determining that the notification has been received, and to include neither the left-view object nor the right-view object in the data broadcast image for display when determining that the notification has not been received.

With the above structure, even if generation of at least one of the left-view object and the right-view object is not complete for any of the plurality of 3D objects, all of the 3D objects for which generation of both the left-view object and the right-view object is complete are placed in the data broadcast image and displayed. Therefore, this structure guarantees stereoscopic perception by the user of the displayed data broadcast image, while alleviating, as compared to conventional devices, the discomfort the user experiences due to a continued state in which no data broadcast image is displayed.

(b) The object data may be transmitted as a combined object, which is a combination of a plurality of single objects, each single object being generated individually by the display data generation unit. The display data generation unit may generate the left-view object and the right-view object for each of the plurality of single objects forming the combined object and provide the notification upon the completion of generation of each single object. The display control unit may make the determination of whether the notification has been received for both the left-view object and the right-view object for each single object.

The combined object may be a character string object that includes a control character. When beginning the generation, the display data generation unit may treat a first character string object before the control character and a second character string object after the control character as single objects.

The combined object may be a character string object that includes a first character string object and a second character string object of differing character type. When generating the left-view object and the right-view object, the display data generation unit may treat the first character string object and the second character string object as single objects.

With the above structure, the determination of whether to include an object in the data broadcast image is not made for each combined object, which the transmitting end sets as the unit of object data generation, but rather for each single object, which is a smaller unit set by the data broadcast display device.

(c) The object data may be transmitted as a partial object smaller than a single object, the single object being generated individually by the display data generation unit.

The display data generation unit may generate the left-view object and the right-view object for each single object formed by a plurality of partial objects and provide the notification upon the completion of generation of each single object. The display control unit may make the determination of whether the notification has been received for both the left-view object and the right-view object for each single object.

A layout position in the data broadcast image may be specified for each partial object. When beginning the generation, the display data generation unit may treat a plurality of partial objects with overlapping layout positions as one single object.

With the above structure, the determination of whether to include an object in the data broadcast image is not made for each partial object, which the transmitting end sets as the unit of object data generation, but rather for each single object, which is a larger unit set by the data broadcast display device.

(d) The reception unit may receive the object data from broadcast waves.

The above structure allows for generation of the left-view object and the right-view object by acquiring the object data from a broadcast.

(e) A data broadcast display method according to an aspect of the present invention is used in a data broadcast display device for displaying a data broadcast image including a plurality of 3D objects each represented by a pair of a left-view object and a right-view object, the data broadcast display device including a reception unit, a display data generation unit, and a display control unit, the data broadcast display method comprising the steps of: the reception unit receiving object data for generating a left-view object and a right-view object; the display data generation unit generating the left-view object and the right-view object for each of the plurality of 3D objects using the object data while providing notification upon completion of the generation of each left-view object and each right-view object; and the display control unit determining, at predetermined time intervals, whether the notification has been received for both the left-view object and the right-view object for each of the plurality of 3D objects, including of both the left-view object and the right-view object in a data broadcast image for display when determining that the notification has been received, and including neither the left-view object nor the right-view object in the data broadcast image for display when determining that the notification has not been received.

A data broadcast display program according to an aspect of the present invention is for causing a computer to function as a data broadcast display device for displaying a data broadcast image including a plurality of 3D objects each represented by a pair of a left-view object and a right-view object, the data broadcast display program causing the computer to function as: a reception unit configured to receive object data for generating the left-view object and the right-view object; a display data generation unit configured to generate the left-view object and the right-view object for each of the plurality of 3D objects using the object data while providing notification upon completion of the generation of each left-view object and each right-view object; and a display control unit configured to determine, at predetermined time intervals, whether the notification has been received for both the left-view object and the right-view object for each of the plurality of 3D objects, to include both the left-view object and the right-view object in a data broadcast image for display when determining that the notification has been received, and to include neither the left-view object nor the right-view object in the data broadcast image for display when determining that the notification has not been received.

With this structure, even if generation of at least one of the left-view object and the right-view object is not complete for one of the plurality of 3D objects, all of the 3D objects for which generation of both the left-view object and the right-view object is complete is placed in the data broadcast image and displayed. Therefore, this structure guarantees stereoscopic perception by the user of the displayed data broadcast image, while alleviating, as compared to conventional devices, the discomfort the user experiences due to a continued state in which no data broadcast image is displayed.

The data broadcast display device according to an embodiment of the present invention guarantees stereoscopic perception by a user of a displayed data broadcast image, while alleviating, as compared to conventional devices, the discomfort the user experiences due to a continued state in which no data broadcast image is displayed. The data broadcast display device is thus useful as a terminal device or the like that receives a 3D data broadcast.

[Reference Signs List]
100 data broadcast display device
101 demultiplexer
102 video decoder
103 left-view video output unit
104 right-view video output unit
105 left-view video FB
106 right-view video FB
107 data broadcast analysis unit
108 layout acquisition unit
109 user input reception unit
110 synchronous data control unit
111 left-view data broadcast creation unit
112 right-view data broadcast creation unit
113 left-view data broadcast FB
114 right-view data broadcast FB
115 left-view display generation unit
116 right-view display generation unit
117 display control unit
118 display

The invention claimed is:

1. A data broadcast display device for displaying a data broadcast image including a plurality of 3D objects each represented by a pair of a left-view object and a right-view object, comprising:
   a non-transitory memory storing a program; and
   a hardware processor that executes the program and causes the data broadcast display device to:
   receive object data for generating the left-view object and the right-view object;
   generate the left-view object and the right-view object for each of the plurality of 3D objects using the object data while providing notification upon completion of the generation of each left-view object and each right-view object; and
   determine, at predetermined time intervals, whether the notification has been received for both the left-view object and the right-view object for each of the plurality of 3D objects, to include both the left-view object and the right-view object in a data broadcast image for display when determining that the notification has been received, and to include neither the left-view object nor the right-view object in the data broadcast image for display when determining that the notification has not been received,
   wherein when determining that notification has been received for both the left-view object and the right-view object for each of a certain part of the plurality of 3D objects and notification has not been received for both the left-view object and the right-view object for each of another part of the plurality of 3D objects, the data broadcast display device includes both the left-view object and the right-view object for each of the certain part of the plurality of 3D objects in the data broadcast image for display, and includes neither the left-view object nor the right-view object for each of the other part of the plurality of 3D objects in the data broadcast image for display.

2. The data broadcast display device of claim 1, wherein
the object data is transmitted as a combined object, which is a combination of a plurality of single objects, each single object being generated individually by the data broadcast display device,
the data broadcast display device generates the left-view object and the right-view object for each of the plurality of single objects forming the combined object and provides the notification upon the completion of generation of each single object, and the data broadcast display device makes the determination of whether the notification has been received for both the left-view object and the right-view object for each single object.

3. The data broadcast display device of claim 2, wherein the combined object is a character string object that includes a control character, and
when beginning the generation, the data broadcast display device treats a first character string object before the control character and a second character string object after the control character as single objects.

4. The data broadcast display device of claim 2, wherein the combined object is a character string object that includes a first character string object and a second character string object of differing character type, and
when generating the left-view object and the right-view object, the data broadcast display device treats the first character string object and the second character string object as single objects.

5. The data broadcast display device of claim 1, wherein the object data is transmitted as a partial object smaller than a single object, the single object being generated individually by the data broadcast display device,
the data broadcast display device generates the left-view object and the right-view object for each single object formed by a plurality of partial objects and provides the notification upon the completion of generation of each single object, and
the data broadcast display device makes the determination of whether the notification has been received for both the left-view object and the right-view object for each single object.

6. The data broadcast display device of claim 5, wherein a layout position in the data broadcast image is specified for each partial object, and
when beginning the generation, the data broadcast display device treats a plurality of partial objects with overlapping layout positions as one single object.

7. The data broadcast display device of claim 1, wherein the data broadcast display device receives the object data from broadcast waves.

8. A data broadcast display method used in a data broadcast display device for displaying a data broadcast image including a plurality of 3D objects each represented by a pair of a left-view object and a right-view object, the data broadcast display device including a non-transitory memory storing a program and a hardware processor that executes the program and causes the data broadcast display device to perform the data broadcast display method comprising:
receiving object data for generating a left-view object and a right-view object;
generating the left-view object and the right-view object for each of the plurality of 3D objects using the object data while providing notification upon completion of the generation of each left-view object and each right-view object; and
determining, at predetermined time intervals, whether the notification has been received for both the left-view object and the right-view object for each of the plurality of 3D objects, including of both the left-view object and the right-view object in a data broadcast image for display when determining that the notification has been received, and including neither the left-view object nor the right-view object in the data broadcast image for display when determining that the notification has not been received,
wherein when determining that notification has been received for both the left-view object and the right-view object for each of a certain part of the plurality of 3D objects and notification has not been received for both the left-view object and the right-view object for each of another part of the plurality of 3D objects, the data broadcast display method includes both the left-view object and the right-view object for each of the certain part of the plurality of 3D objects in the data broadcast image for display, and includes neither the left-view object nor the right-view object for each of the other part of the plurality of 3D objects in the data broadcast image for display.

9. A non-transitory computer-readable recording medium storing a data broadcast display program for causing a computer to function as a data broadcast display device for displaying a data broadcast image including a plurality of 3D objects each represented by a pair of a left-view object and a right-view object, the data broadcast display program causing the computer to:
receive object data for generating the left-view object and the right-view object;
generate the left-view object and the right-view object for each of the plurality of 3D objects using the object data while providing notification upon completion of the generation of each left-view object and each right-view object; and
determine, at predetermined time intervals, whether the notification has been received for both the left-view object and the right-view object for each of the plurality of 3D objects, to include both the left-view object and the right-view object in a data broadcast image for display when determining that the notification has been received, and to include neither the left-view object nor the right-view object in the data broadcast image for display when determining that the notification has not been received,
wherein when determining that notification has been received for both the left-view object and the right-view object for each of a certain part of the plurality of 3D objects and notification has not been received for both the left-view object and the right-view object for each of another part of the plurality of 3D objects, the data broadcast display device includes both the left-view object and the right-view object for each of the certain part of the plurality of 3D objects in the data broadcast image for display, and includes neither the left-view object nor the right-view object for each of the other part of the plurality of 3D objects in the data broadcast image for display.

* * * * *